(12) United States Patent
Uesaka et al.

(10) Patent No.: US 11,184,596 B2
(45) Date of Patent: Nov. 23, 2021

(54) IMAGE PROCESSING DEVICE, REPRODUCTION DEVICE, IMAGE PROCESSING METHOD, AND REPRODUCTION METHOD

(71) Applicant: Panasonic Intellectual Property Management Co., Ltd., Osaka (JP)

(72) Inventors: Yasushi Uesaka, Hyogo (JP); Masayuki Kozuka, Osaka (JP); Yoshihiro Mori, Tokyo (JP); Toshiyuki Fukushima, Osaka (JP); Kazuhiko Kouno, Osaka (JP); Yoshiichiro Kashiwagi, Kyoto (JP); Shigeo Sakaue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 51 days.

(21) Appl. No.: 16/317,081

(22) PCT Filed: Jul. 25, 2017

(86) PCT No.: PCT/JP2017/026748
§ 371 (c)(1),
(2) Date: Jan. 11, 2019

(87) PCT Pub. No.: WO2018/021261
PCT Pub. Date: Feb. 1, 2018

(65) Prior Publication Data
US 2019/0246087 A1    Aug. 8, 2019

Related U.S. Application Data

(60) Provisional application No. 62/367,425, filed on Jul. 27, 2016.

(30) Foreign Application Priority Data

Jun. 23, 2017   (JP) .............................. JP2017-123170

(51) Int. Cl.
*H04N 9/87*   (2006.01)
*H04N 5/77*   (2006.01)
(Continued)

(52) U.S. Cl.
CPC ........... *H04N 9/8715* (2013.01); *G06T 5/007* (2013.01); *G11B 20/10* (2013.01); *H04N 5/2355* (2013.01);
(Continued)

(58) Field of Classification Search
CPC .... H04N 9/8715; H04N 5/772; H04N 9/7925; H04N 5/2355; H04N 5/265; H04N 5/91; G06T 5/007; G11B 20/10
See application file for complete search history.

(56) References Cited

U.S. PATENT DOCUMENTS

2003/0142950 A1\*  7/2003  Um ........................ G11B 27/32
                                                     386/241
2008/0129728 A1\*  6/2008  Satoshi ................. G06T 3/0012
                                                     345/419

(Continued)

FOREIGN PATENT DOCUMENTS

EP         3196881 A1    7/2017
JP         2007-074124   3/2007
(Continued)

OTHER PUBLICATIONS

The Extended European Search Report dated Jun. 17, 2019 for the related European Patent Application No. 17834267.1.
(Continued)

*Primary Examiner* — Nhan T Tran
*Assistant Examiner* — Tuan H Le
(74) *Attorney, Agent, or Firm* — McDermott Will and Emery LLP

(57) ABSTRACT

An image processing device includes an acquisition section configured to acquire still image data obtained by imaging, a generator configured to generate, from the still image data acquired by the acquisition section, a logically single data unit including first still image data and second still image data different from each other in luminance dynamic range and reproducible independently from each other, and an output section configured to output the data unit generated by the generator.

7 Claims, 34 Drawing Sheets

(51) Int. Cl.
*H04N 9/79* (2006.01)
*G06T 5/00* (2006.01)
*G11B 20/10* (2006.01)
*H04N 5/235* (2006.01)
*H04N 5/265* (2006.01)
*H04N 5/91* (2006.01)

(52) U.S. Cl.
CPC ............ *H04N 5/265* (2013.01); *H04N 5/772* (2013.01); *H04N 5/91* (2013.01); *H04N 9/7925* (2013.01)

(56) References Cited

U.S. PATENT DOCUMENTS

| | | | |
|---|---|---|---|
| 2008/0192819 A1 | 8/2008 | Ward et al. | |
| 2008/0310501 A1 | 12/2008 | Ward et al. | |
| 2013/0162856 A1* | 6/2013 | Song | H04N 5/23216 348/222.1 |
| 2013/0329087 A1 | 12/2013 | Tico et al. | |
| 2014/0022408 A1 | 1/2014 | Nashizawa | |
| 2015/0281573 A1* | 10/2015 | Sasaki | H04N 5/772 348/231.99 |
| 2016/0227092 A1 | 8/2016 | Ikeda | |
| 2016/0241808 A1* | 8/2016 | Hamada | H04L 65/601 |
| 2016/0301907 A1* | 10/2016 | Uchimura | G11B 27/329 |
| 2017/0221524 A1 | 8/2017 | Uchimura et al. | |
| 2017/0223329 A1 | 8/2017 | Uchimura et al. | |
| 2019/0052908 A1* | 2/2019 | Mertens | G09G 5/10 |

FOREIGN PATENT DOCUMENTS

| | | |
|---|---|---|
| JP | 2007-534238 | 11/2007 |
| JP | 2008-204266 | 9/2008 |
| JP | 2014-023062 | 2/2014 |
| JP | 2014-204175 | 10/2014 |
| JP | 2015-056807 | 3/2015 |
| WO | 2005/104035 | 11/2005 |
| WO | 2016/039025 | 3/2016 |
| WO | 2016/039172 | 3/2016 |

OTHER PUBLICATIONS

International Search Report of PCT application No. PCT/JP2017/026748 dated Oct. 17, 2017.

* cited by examiner

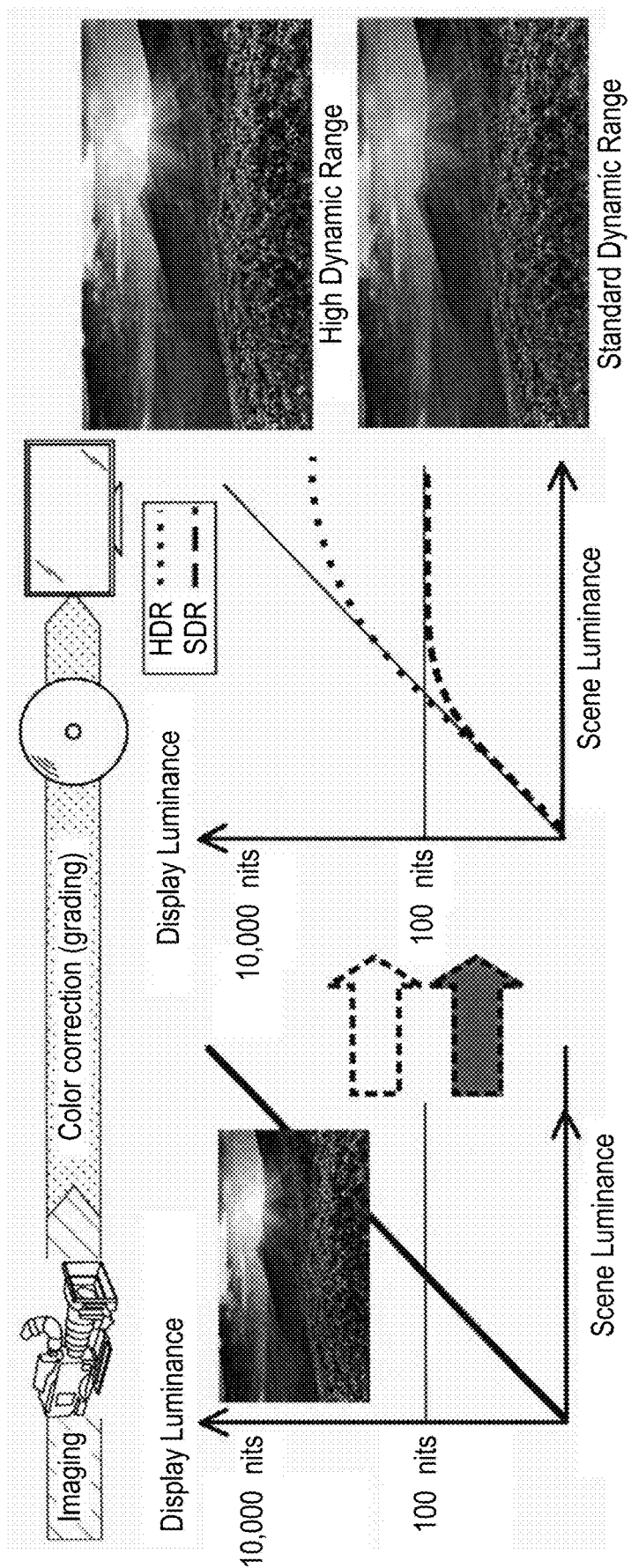

IMAGE PROCESSING DEVICE, REPRODUCTION DEVICE, IMAGE PROCESSING METHOD, AND REPRODUCTION METHOD

CROSS-REFERENCE TO RELATED APPLICATIONS

This application is a U.S. national stage application of the PCT International Application No. PCT/JP2017/026748 filed on Jul. 25, 2017, which claims the benefit of foreign priority of Japanese patent application No. 2017-123170 filed on Jun. 23, 2017 and the benefit of priority of U.S. patent application No. 62/367,425 filed on Jul. 27, 2016, the contents all of which are incorporated herein by reference.

TECHNICAL FIELD

The present disclosure relates to an image processing device, a reproduction device, an image processing method, and a reproduction method.

BACKGROUND ART

PTL 1 discloses an imaging device configured to synthesize a plurality of images varied in exposure to record a high dynamic range (HDR) still image having a wide dynamic range.

The technique disclosed in PTL 1 hardly achieves highly convenient still image data.

CITATION LIST

Patent Literature

PTL 1: Unexamined Japanese Patent Publication No. 2015-056807

SUMMARY

The present disclosure provides an image processing device configured to obtain highly convenient still image data, a reproduction device, an image processing method, and a reproduction method.

The present disclosure provides an image processing device including: an acquisition section configured to acquire still image data obtained by imaging; a generator configured to generate, from the still image data acquired by the acquisition section, a logically single data unit including first still image data and second still image data different from each other in luminance dynamic range and reproducible independently from each other; and an output section configured to output the data unit generated by the generator.

The present disclosure also provides a reproduction device including: an acquisition section configured to acquire a logically single data unit including first still image data and second still image data different from each other in luminance dynamic range and reproducible independently from each other; and a reproducer configured to reproduce either one of the first still image data or the second still image data included in the data unit acquired by the acquisition section.

General or specific aspects of these devices can be implemented by a system, a method, an integrated circuit, a computer program, or a recording medium such as a computer-readable CD-ROM. The aspects can alternatively be implemented through any appropriate combination among the system, the method, the integrated circuit, the computer program, and the recording medium.

The image processing device according to the present disclosure obtains highly convenient still image data.

BRIEF DESCRIPTION OF DRAWINGS

FIG. 2 is an explanatory view of an HDR display technique.

Figure 1:
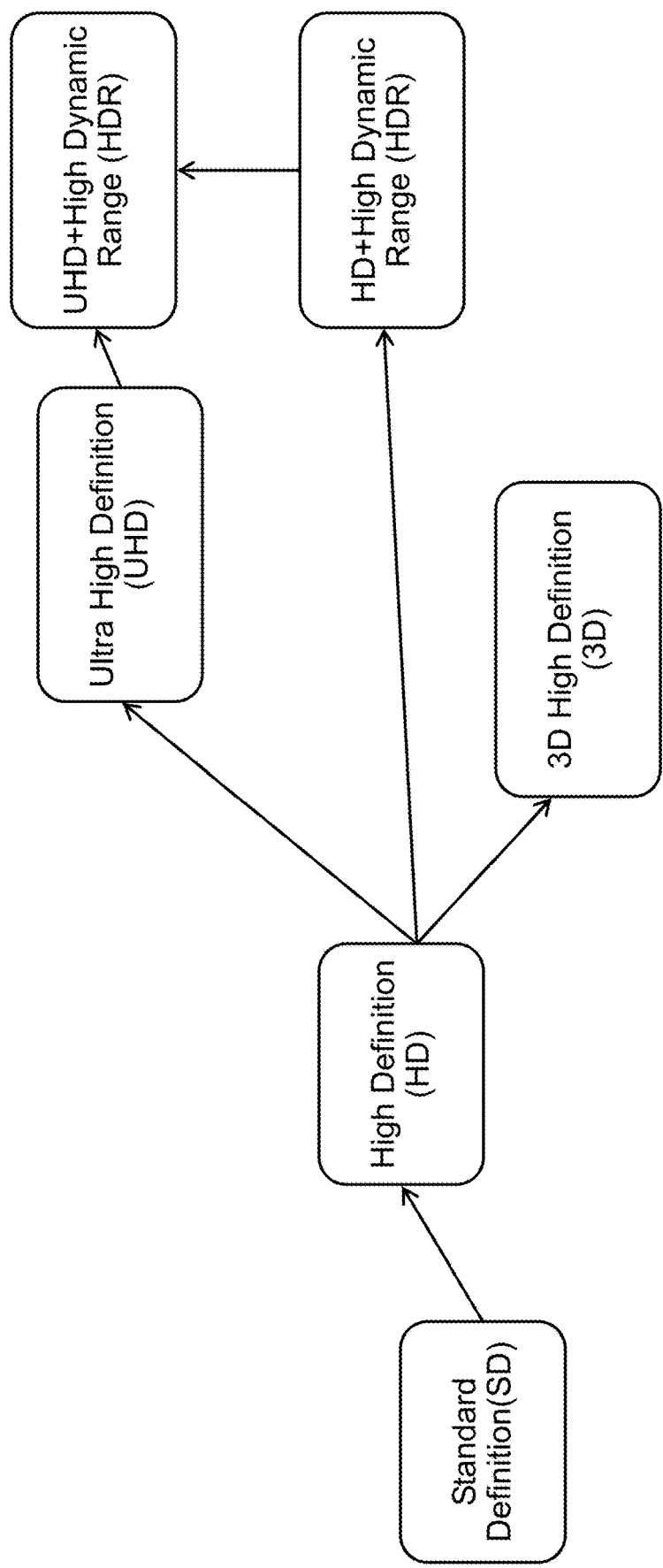
FIG. 1 is an explanatory view of development of imaging techniques.

DESCRIPTION OF EMBODIMENTS (Object of the Present Disclosure)

The present disclosure provides a high dynamic range (HDR) still image having a new user value and a new photographing culture, in accordance with two techniques of an HDR display technique and an HDR imaging technique. The new user value relates to generation of still image data enhanced in realistic sensation and reduced in blown out highlights (tone defectiveness in a light region), blocked up shadows (tone defectiveness in a dark region), and the like. The new photographing culture relates to appreciation of an HDR still image obtained through imaging with a camera adaptive to imaging of an HDR still image and displayed on a display device adaptive to HDR display (hereinafter, called an "HDR display device"). The HDR still image is also called an HDR picture.

The present disclosure provides an image processing device and an image processing method achieving generation of still image data that can be displayed or printed also by a display device adaptive to SDR display but nonadaptive to HDR display (hereinafter, called an "SDR display device") and a printing device adaptive to SDR still image printing but nonadaptive to HDR still image printing (hereinafter, called an "SDR printing device"). Specifically, the present disclosure provides an image processing device and an image processing method achieving improved convenience of HDR still image data by provision of still image data that can be reproduced as an HDR still image, to a device adaptive to HDR still image processing as well as a device adaptive to SDR still image processing but nonadaptive to HDR still image processing. Reproduction of an HDR still image in the present disclosure includes displaying the HDR still image and printing by processing the HDR still image. In other words, reproduction includes displaying and printing in the present disclosure.

Determination of a data format of still image data of such an HDR still image requires determination of whether or not to support compatibility with a conventional SDR display device or a conventional SDR printing device adaptive to SDR still images. Compatibility with existing equipment is typically important upon introduction of a new data format.

Compatibility with a conventional device may be supported by storing new HDR still image data having an extended attribute and the like in a joint photographic experts group (JPEG) as a conventional standard data format. JPEG has, however, 8-bit tone restriction. It is thus difficult to store HDR still image data having at least 10-bit tones in JPEG.

In order to be adaptive to such JPEG restriction as well as support compatibility with a conventional device, two types of data, namely, JPEG data as SDR still image data and new HDR still image data, can be stored in a single file having JPG as an extension achieving the compatibility.

Supporting compatibility with a conventional device in such a manner may lead to deletion of HDR picture data stored in a JPEG file upon edition or display of the JPEG file with use of editing software or display software due to restriction of a JPEG file format. It will thus be desired to give up compatibility with a conventional device and adopt an optimal format for HDR. In this case, printing devices, display devices, cameras, and the like currently in use are desired to require correction, modification, or the like (also called a mounting load) for adaptivity to HDR as less as possible.

For example, sophisticated mobile terminals like smartphones have been spread to allow users of such mobile terminals to obtain HDR still image data through HDR synthesis executed in the mobile terminals. The users by themselves can thus execute more easily than before, separate generation and management of an SDR shooting file (a conventional JPEG file) and an HDR shooting file. Instead of generating a conventional JPEG file simultaneously upon generation of HDR still image data with use of an imaging device like a camera and storing two types of data, namely, the HDR still image data and SDR still image data in a single file, the imaging device can be provided with an option of managing these two types of data separately.

In a case where a television set or a camera configured to record moving images is provided with a new HDR data format function, the device equipped with an HEVC encoder can adopt a data format of a still image obtained through HEVC compression. It is, however, not practical to equip a camera not configured to record moving images with an HEVC encoder for moving image compression, to achieve such a data format of a still image obtained through HEVC compression. Such a camera may be required to be adaptive to HDR still image data that is based on a tagged image file format (TIFF) enabling storage of uncompressed data.

In a case of printing HDR still image data with use of an SDR printing device, the device can adopt an HDR technique achieving compatibility with a conventional device, such as hybrid log gamma (HLG) as a candidate data format.

The present disclosure achieves an image processing device and a reproduction device that are adaptive to various requirements for an HDR still image data format, such as whether or not to be compatible with a conventional device and whether or not to have any mounting load to the conventional device.

(Background of HDR Display Technique)

FIG. 1 is an explanatory view of development of imaging techniques.

Video quality improvement has mainly been achieved by increase in a number of display pixels. High definition (HD) video having 1920×1080 pixels has been spread in place of conventional standard definition (SD) video having 720× 480 pixels.

Ultra high definition (UHD) video having 3840×2160 pixels or video having further increased 4096×2160 pixels (so-called 4K video) have recently been proposed for further video quality improvement. There have also been considered, along with such 4K video, dynamic range extension, color gamut extension, addition of frame rates, and the like.

The dynamic range has a high dynamic range (HDR) proposed as a system achieving support of dark tones as well as representation of light rays such as specular reflected light difficult to be represented with current television signals, with more realistic lightness. Conventional television signals have been categorized in a standard dynamic range (SDR) having highest luminance of 100 nits. In contrast, HDR has highest luminance possibly enhanced to at least 1000 nits. Standardization for mastering displays has also been in progress in the Society of Motion Picture and Television Engineers (SMPTE), the International Telecommunication Union-Radiocommunication Sector (ITU-R), and the like. Specific examples of HDR application targets include, similarly to HD and UHD, broadcasting, package media (e.g. Blu-ray discs), and internet distribution.

(HDR Display Technique)

FIG. 2 is an explanatory view of the HDR display technique.

HDR is not a system achieving a television set of simply high lightness. HDR is a system having a video luminance range extended to 0 nits to 10,000 nits (as ST 2084) from 0.1 nits to 100 nits defined by a standard of Broadcasting Service (Television) 709 (bt.709) exemplifying SDR, to enable representation of the sun, the sky, light rays, and the like having light colors and unsuccessfully represented before, and enable simultaneous recording of a light portion and a dark portion. Luminance herein is optical luminance having physical quantity indicative of lightness of a light source. HDR includes two systems, namely, SMPTE ST 2084 suitable for video (packaged video) graded (processed for adjustment of colors and tones of the video) subsequent to imaging, video for Internet Protocol (IP) distribution, and the like, and Hybrid Log Gamma (HLG) suitable for video for live broadcasting, video imaged by users, and the like.

The HDR display technique includes the HLG system achieving compatibility between SDR and HDR, and a PQ system having no simple display compatibility between SDR and HDR.

Figure 3A:
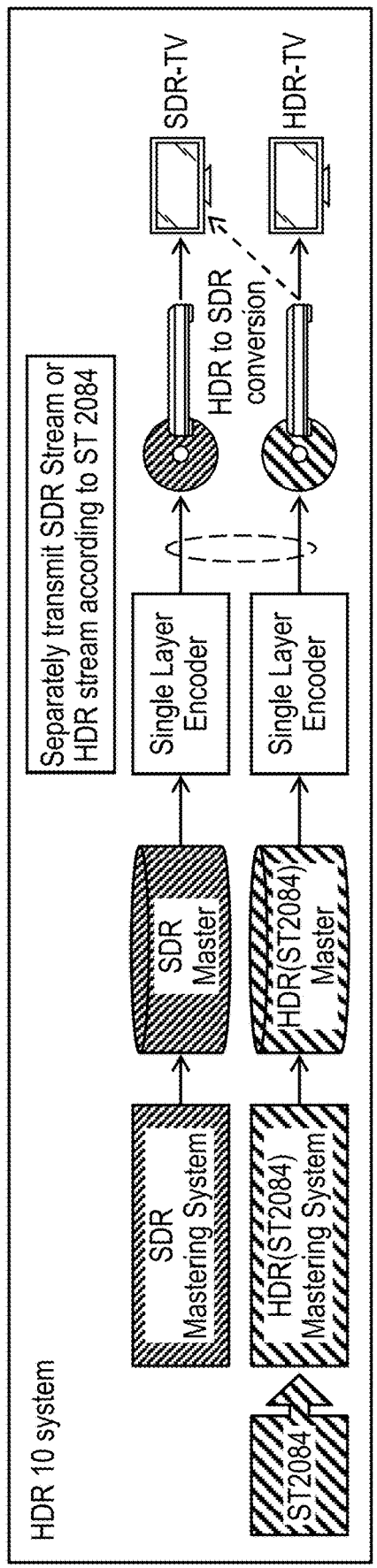
FIG. 3A is an explanatory view of a perceptual quantization (PQ) system.
Figure 3B:
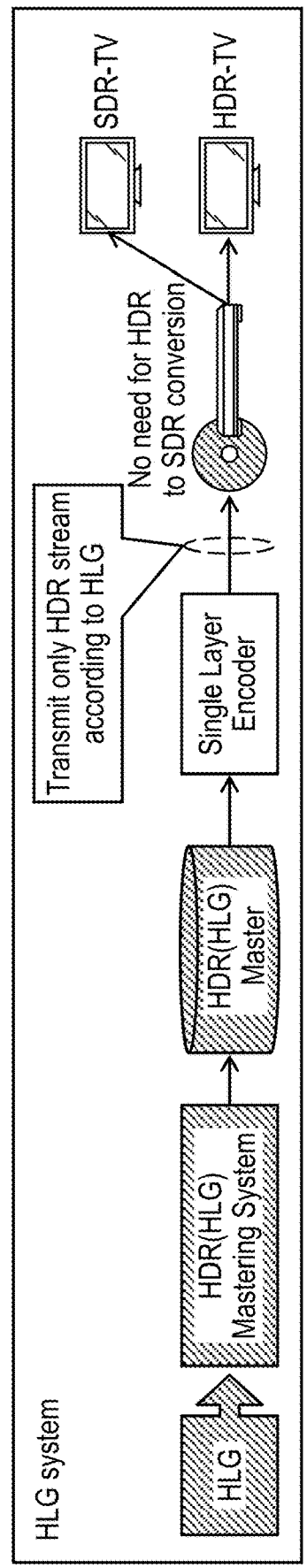
FIG. 3B is an explanatory view of a hybrid log gamma (HLG) system.

FIG. 3A is an explanatory view of the PQ system. FIG. 3B is an explanatory view of the HLG system.

As depicted in FIG. 3A, SMPTE ST 2084 (PQ) is a system achieving no compatibility between SDR and HDR. SDR and HDR are graded separately and transmitted separately in this system. This system requires SDR conversion of converting HDR video data to SDR video data in order to display video reproduced in accordance with Ultra HD Blu-ray on an SDRTV (a television set adaptive to SDR but nonadaptive to HDR).

As depicted in FIG. 3B, ITU-R 2100 Hybrid Log Gamma (HLG) is a system having compatibility between SDR and HDR. This system includes HLG grading and transmission of only an HLG stream. The HLG stream has compatibility with SDR. HDR video data can thus be displayed on an SDRTV without need for conversion from the HDR video data to SDR video data.

Figure 4:
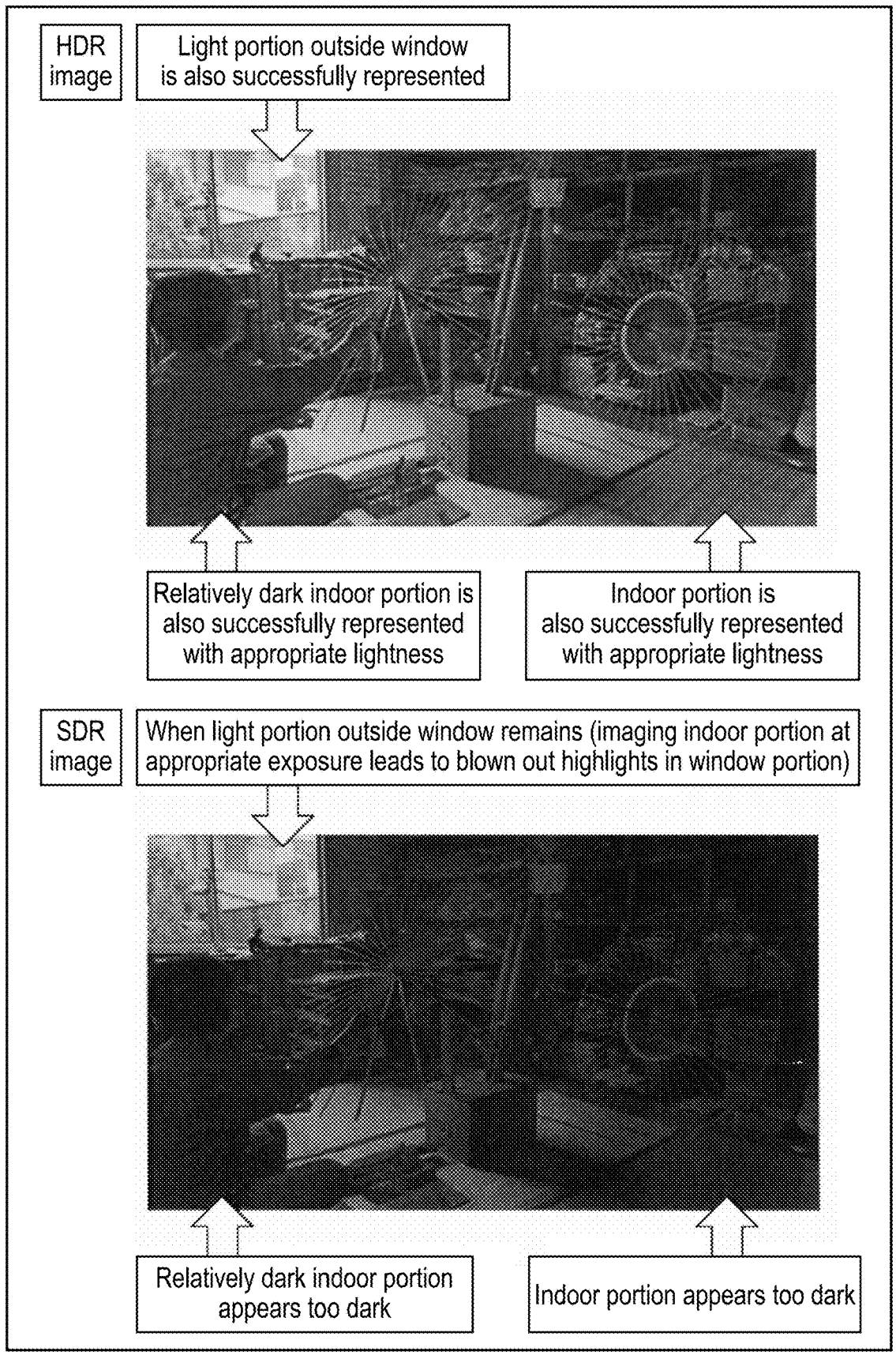
FIG. 4 depicts an exemplary HDR image adaptive to HDR compared with an exemplary SDR image adaptive to SDR.

FIG. 4 depicts an exemplary HDR image adaptive to HDR compared with an exemplary SDR image adaptive to SDR. FIG. 4 depicts an HDR image and an SDR image of a single picture having comparatively large difference between lightness and darkness and including a relatively dark indoor portion and a relatively light portion outside a window.

An HDR image is obtained by reproducing HDR still image data or HDR moving image data. An SDR image is obtained by reproducing SDR still image data or SDR moving image data. As exemplified in FIG. 4, both the relatively light portion outside the window and the relatively dark indoor portion in the HDR image are each represented with appropriate lightness. In contrast, the SDR image has exposure adjusted for representation of the relatively light portion outside the window, so that the relatively dark indoor portion is too dark and has partial blocked up shadows to achieve poor appearance. If the exposure is adjusted for appropriate representation of the indoor portion, the portion outside the window will become too light and have partial blown out highlights to achieve poor appearance (not depicted). The HDR image thus achieves appropriate tones and reduction of both blown out highlights and blocked up shadows in such a single picture having comparatively large difference between lightness and darkness and including a relatively light portion and a relatively dark portion, and being difficult to be represented in an SDR image.

Figure 5:
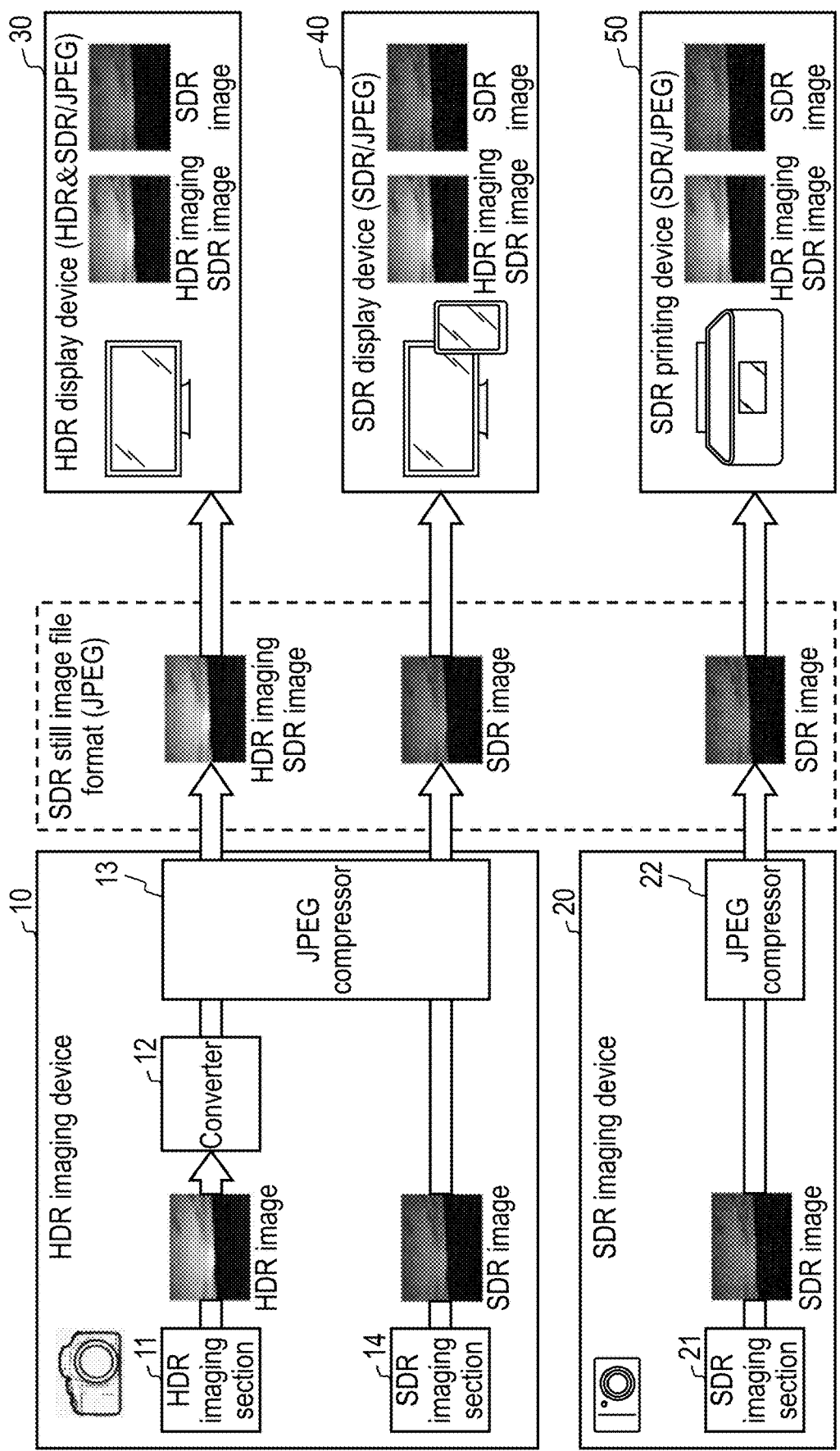
FIG. 5 is an explanatory view of imaging devices adaptive to HDR or SDR, file formats of image data obtained by the imaging devices, and a display device configured to display the image data or a printing device configured to print the image data.

FIG. 5 is an explanatory view of imaging devices adaptive to HDR or SDR, file formats of image data obtained by the imaging devices, and a display device configured to display image data or a printing device configured to print image data.

FIG. 5 depicts HDR imaging device 10 adaptive to HDR imaging. HDR imaging device 10 includes HDR imaging section 11, SDR imaging section 14, converter 12, and JPEG compressor 13. HDR imaging device 10 is configured to enable SDR display device 40 or SDR printing device 50 to display or print image data obtained through imaging in an HDR shooting mode by HDR imaging section 11. Specifically, converter 12 in HDR imaging device 10 converts HDR still image data of an HDR image obtained through imaging in the HDR shooting mode by HDR imaging section 11, to SDR still image data. In HDR imaging device 10, JPEG compressor 13 JPEG compresses the SDR still image data obtained through conversion by converter 12 to obtain SDR still image data in a JPEG format to be output. In HDR imaging device 10, JPEG compressor 13 also JPEG compresses SDR still image data of an SDR image obtained through imaging in a conventional shooting mode (an SDR shooting mode) by SDR imaging section 14 to obtain SDR still image data in the JPEG format to be output.

SDR imaging device 20 includes SDR imaging section 21 and JPEG compressor 22. In SDR imaging device 20, JPEG compressor 22 JPEG compresses SDR still image data of an SDR image obtained through imaging by SDR imaging section 21 similarly to the case of imaging in the conventional shooting mode (the SDR shooting mode) by HDR imaging device 10, to obtain SDR still image data in the JPEG format to be output.

Accordingly, each of HDR display device 30, SDR display device 40, and SDR printing device 50 acquires SDR still image data obtained through SDR conversion of HDR still image data obtained by HDR imaging, or SDR still image data obtained by SDR imaging, and reproduces (displays or prints) the SDR image according to the SDR still image data.

The HDR shooting mode will be described next with reference to FIG. 6 and FIG. 7.

Figure 6:
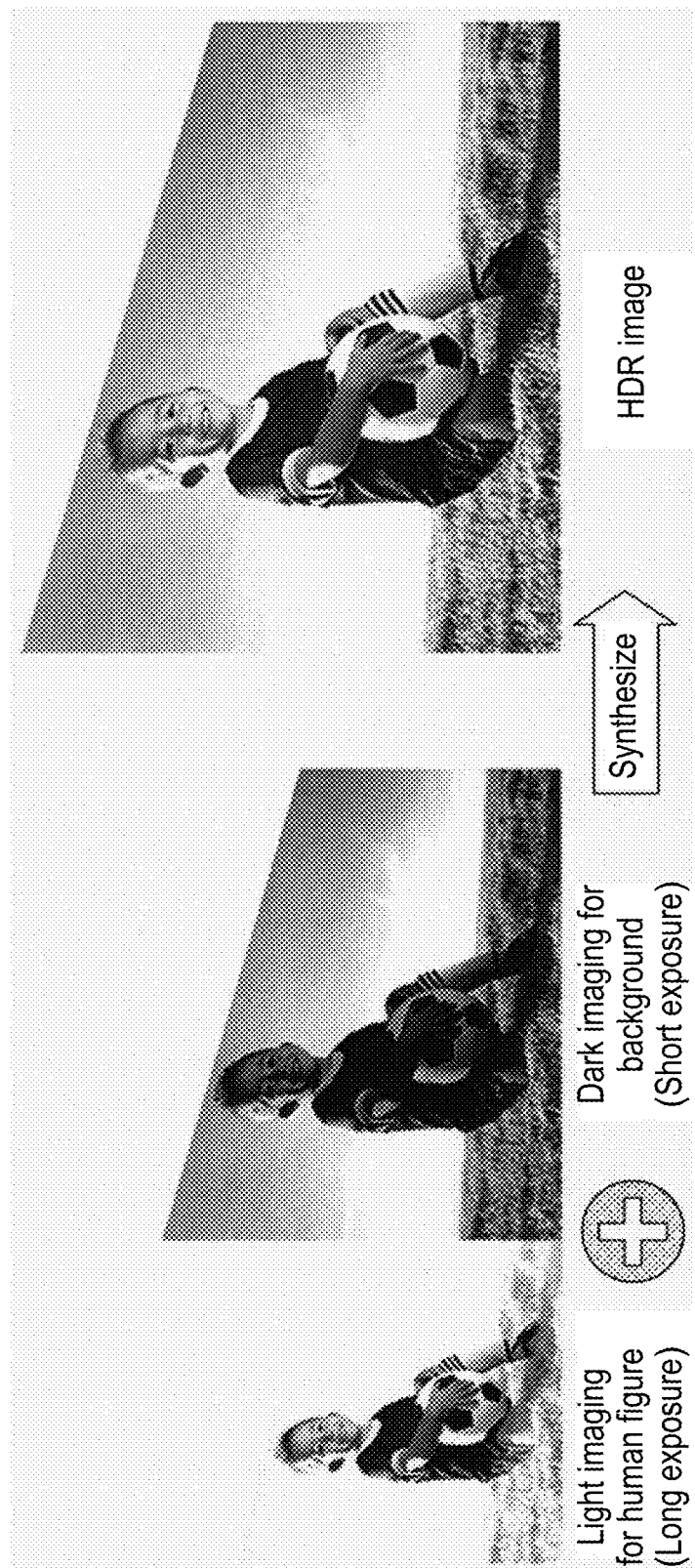
FIG. 6 is an explanatory view of an HDR shooting mode of synthesizing two images to obtain an image having an extended dynamic range.
Figure 7:
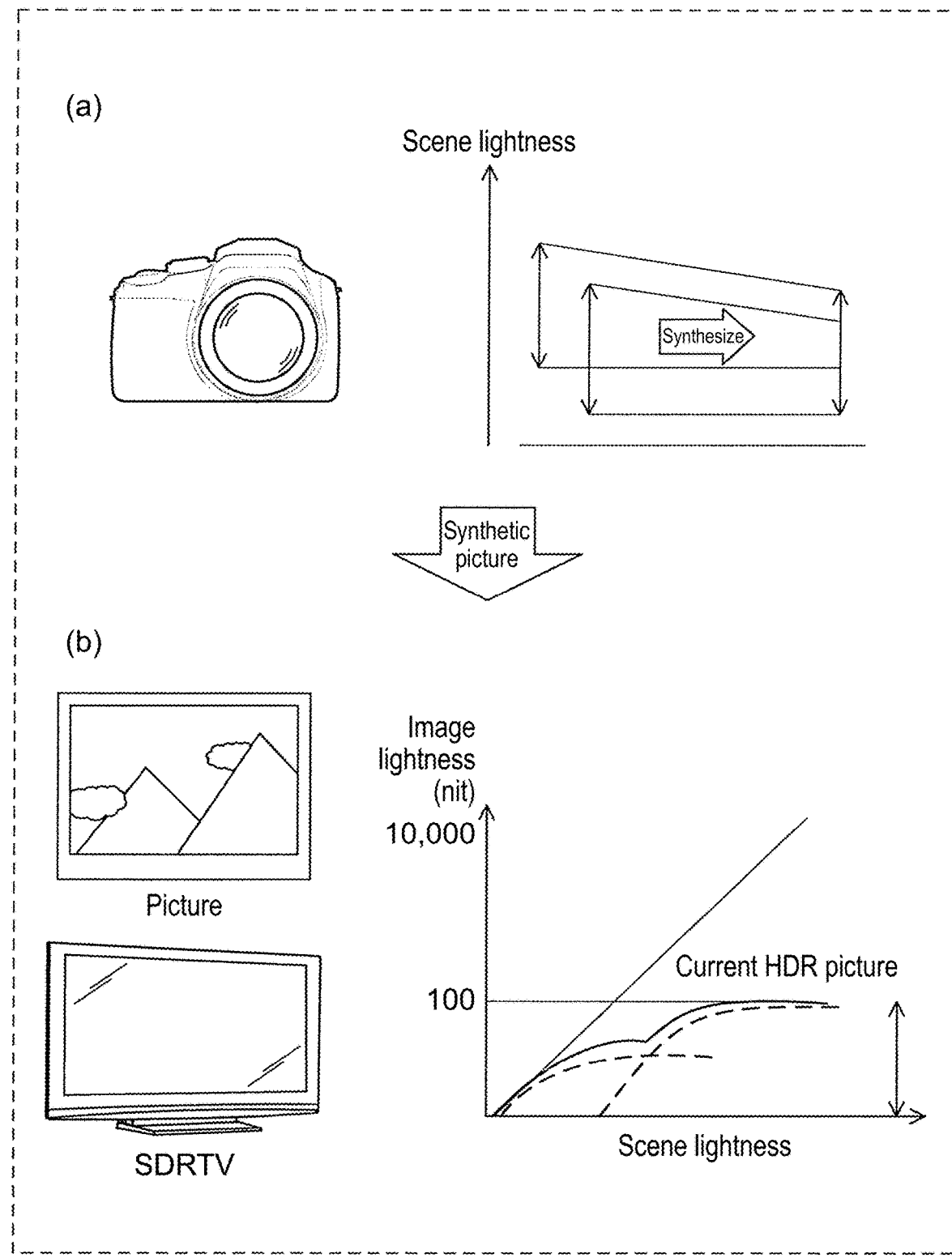
FIG. 7 is another explanatory view of the HDR shooting mode of synthesizing two images to obtain an image having an extended dynamic range.

Each of FIG. 6 and FIG. 7 is an explanatory view of the HDR shooting mode of synthesizing two images to obtain an image having an extended dynamic range.

Some of smartphones, digital cameras, and the like have the HDR shooting mode of imaging video having a wide luminance range. As depicted in FIG. 6 and a part (a) of FIG. 7, in the HDR shooting mode, two SDR images obtained through double exposure (a technique of imaging an identical shooting target subject a plurality of times under exposure conditions different from each other) or the like are synthesized to have luminance within the range according to SDR, so as to obtain HDR image data having such a wide luminance range. As depicted in FIG. 6 and a part (b) of FIG. 7, an HDR image can thus be displayed by an SDR display device.

An HDR image obtained through imaging for HDR display will be described next with reference to FIG. 8.

Figure 8:
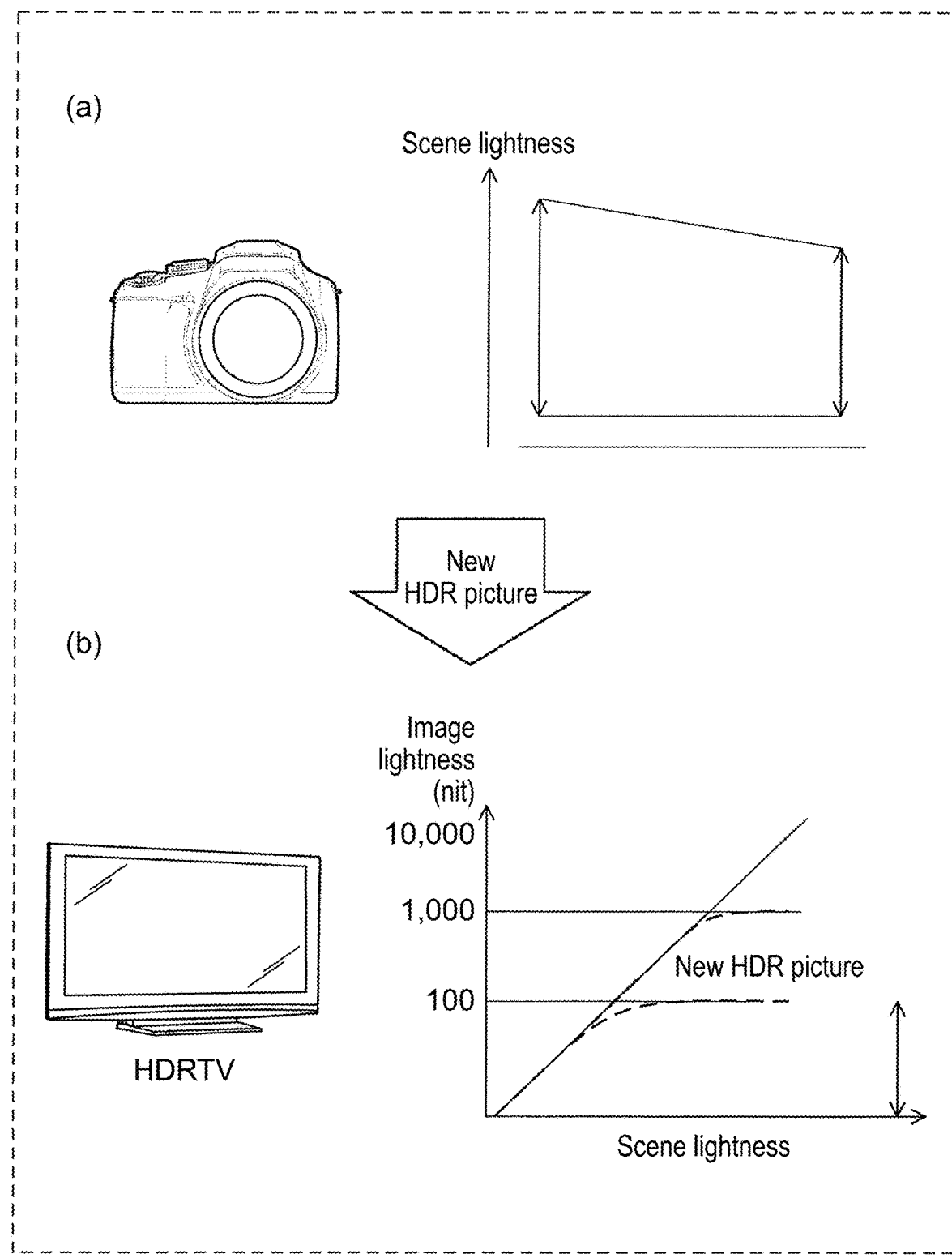
FIG. 8 is an explanatory view of an HDR image obtained through imaging for HDR display.

FIG. 8 is an explanatory view of the HDR image obtained for HDR display.

As depicted in FIG. 8, the HDR image for HDR display includes a captured target scene having lightness within a luminance range wider than a luminance range of an SDR shooting mode. Image data obtained through the imaging is graded to generate an HDR image for HDR display, and the HDR image is transmitted to each device for reproduction. An HDR image is wider in luminance range than an SDR image and cannot be displayed simply by an SDR display device. Displaying an HDR image with an SDR display device requires conversion from the HDR image to an SDR image.

In the HDR shooting mode described with reference to FIG. 6 and FIG. 7, the image generated through synthesis has luminance within the range according to SDR and can thus be reproduced by both HDR display device 30 and SDR display device 40 (or SDR printing device 50).

Difference between a color space of a moving image and a color space of a still image will be described next with reference to FIG. 9.

Figure 9:
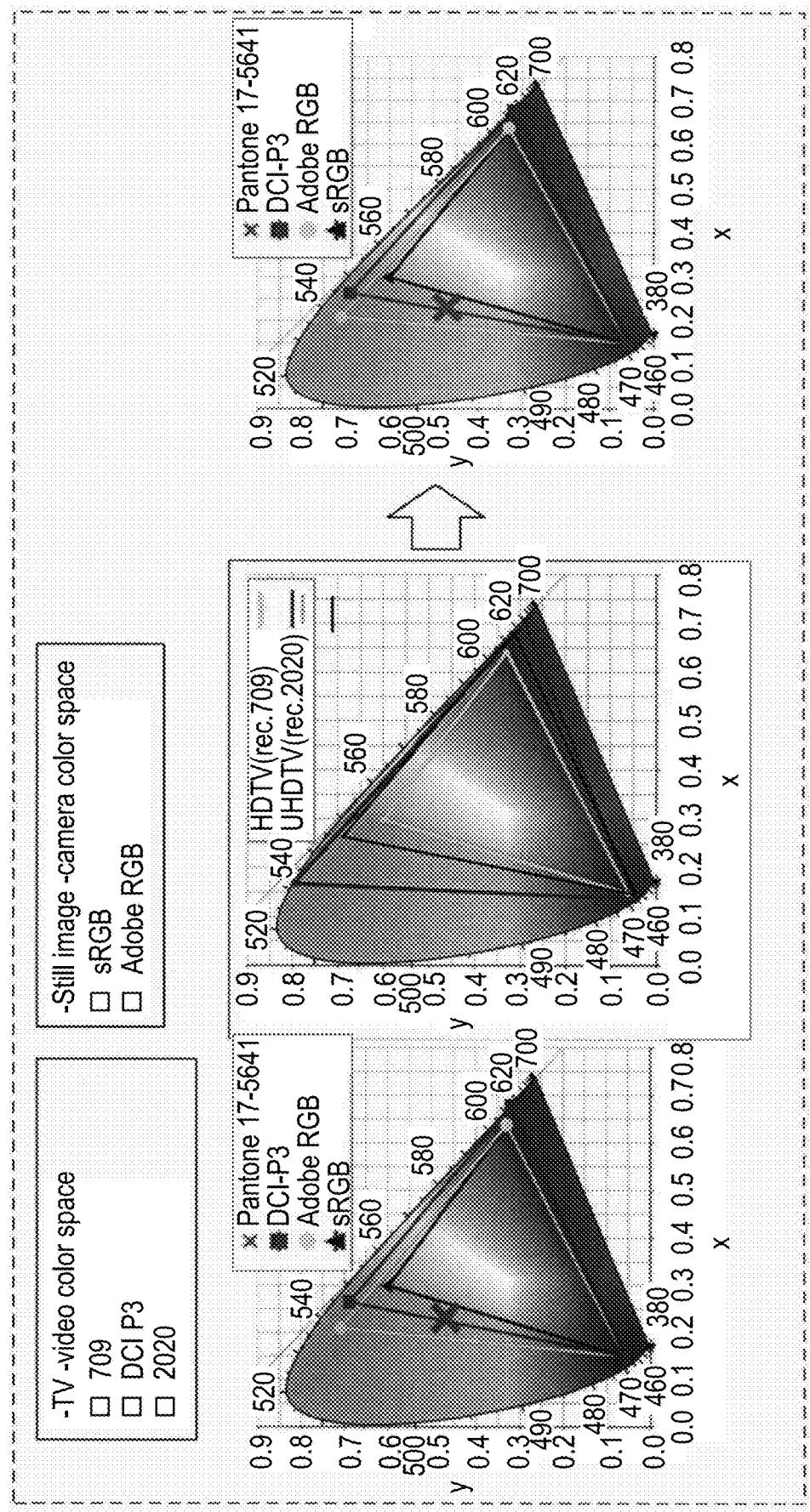
FIG. 9 is an explanatory view of difference between a color space of a moving image and a color space of a still image.

FIG. 9 is an explanatory view of difference between the color space of a moving image and the color space of a still image.

The standard for the color space of a moving image, bt.709, and a standard for the color space of a still image, standard RGB (sRGB) are named differently but define an identical color space. There is also defined an extended color space from the color space defined by bt.709 or sRGB.

There is bt.2020 that is standardized for ULTRA HD and defines a larger color space in comparison to Digital Cinema Initiatives (DCI) P3 or AdobeRGB. The color space of DCI P3 or AdobeRGB can thus be covered by bt.2020. The color space of DCI P3 and the color space of AdobeRGB have areas approximately equal to each other but have regions different from each other.

Figure 10:
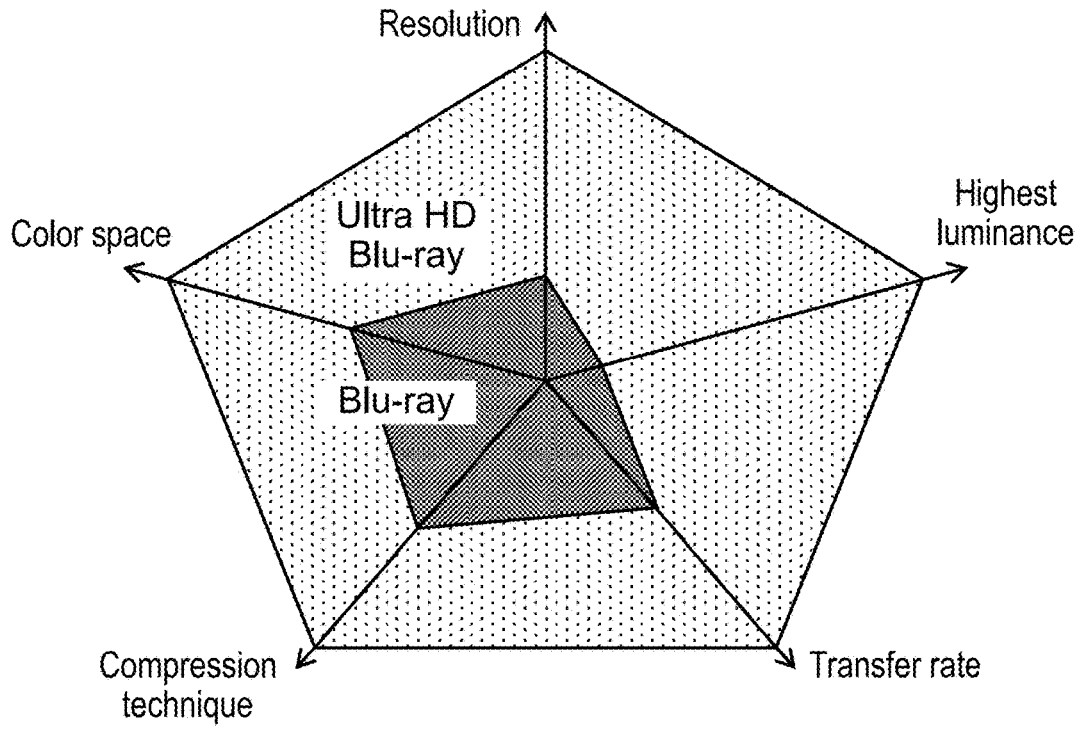
FIG. 10 is a comparative view between Ultra HD Blu-ray (registered trademark, the same applies hereinafter) and Blu-ray.

FIG. 10 is a comparative view between Ultra HD Blu-ray and Blu-ray.

As indicated in FIG. 10, Ultra HD Blu-ray surpasses Blu-ray in all points of resolution, color space, highest luminance (HDR), compression technique, and transfer rate.

The description will continue with reference again to FIG. 5. There has recently been proposed an HDR display device such as an HDRTV, configured to display HDR image data for HDR image display without SDR conversion.

Unlike the HDRTV, a camera having the HDR shooting mode (an HDR imaging function) is configured in accordance with the HDR technique mainly for backlight correction and the like. A still image obtained through imaging with the camera in accordance with the HDR technique is reproduced typically by an SDR display device or an SDR printing device. Although the camera includes an imaging device configured to generate HDR image data for video and can execute imaging according to the HDR technique, the camera SDR converts an HDR image obtained in the HDR shooting mode and outputs SDR still image data. The camera having the HDR imaging function is configured to generate HDR image data having a wide luminance range utilizing display capability of an HDRTV, but typically does not generate such HDR image data.

Figure 11:
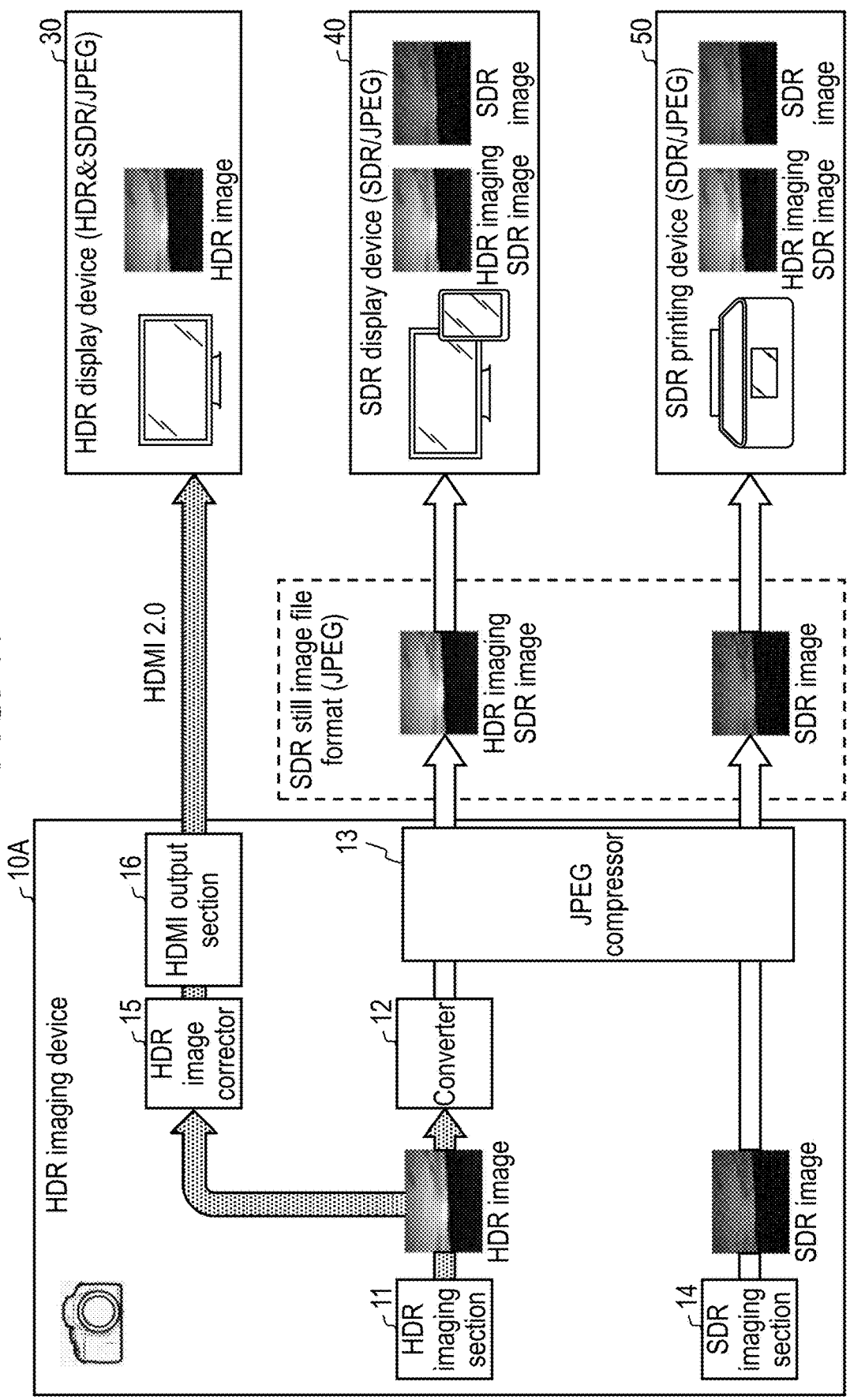
FIG. 11 is an explanatory view of an HDR imaging device configured to generate an HDR image having a wide luminance range.

FIG. 11 is an explanatory view of HDR imaging device 10A configured to generate an HDR image having a wide luminance range.

In order to utilize an HDR display function of the HDRTV (e.g. HDR display device 30), the HDRTV simply displays HDR image data generated for HDR display without conversion to SDR image data.

HDR imaging device 10A depicted in FIG. 11 includes HDR imaging section 11, SDR imaging section 14, converter 12, JPEG compressor 13, HDR image corrector 15, and high-definition multimedia interface (HDMI, registered trademark, the same applies hereinafter) output section 16. In HDR imaging device 10A, HDR image corrector 15 corrects an HDR image to generate HDR image data.

HDR image corrector 15 converts RAW data obtained through imaging by HDR imaging section 11 or the like to a 10-bit image that can be displayed by the HDRTV (e.g. HDR display device 30 adaptive to an HDR 10 standard) with use of an HDR-electro-optical transfer function (HDR-EOTF) such as a PQ curve. HDR imaging device 10A subsequently transmits HDR image data obtained by HDR image corrector 15 from HDMI output section 16 to the HDRTV (e.g. HDR display device 30). The HDRTV (e.g. HDR display device 30) having received the HDR image data then displays an HDR image according to the HDR image data.

HDR imaging device 10A and HDR display device 30 need to be interconnected via an HDMI cable adaptive to an HDMI 2.0 standard in this case. HDR imaging device 10A is not configured to simply transmit HDR image data to a device nonadaptive to the HDMI 2.0 standard. In order to solve this problem, there is demanded an HDR still image file format enabling transmission of HDR image data also to such a device nonadaptive to the HDMI 2.0 standard. In other words, the HDR still image file format for storage and exchange of data kept in an HDR format is required to solve this problem, so as to enable exchange of data in an SDR still image file format between HDR imaging device 10A and each of HDR display device 30, SDR display device 40, and SDR printing device 50. The HDR still image file format has, however, the following problem.

Figure 12:
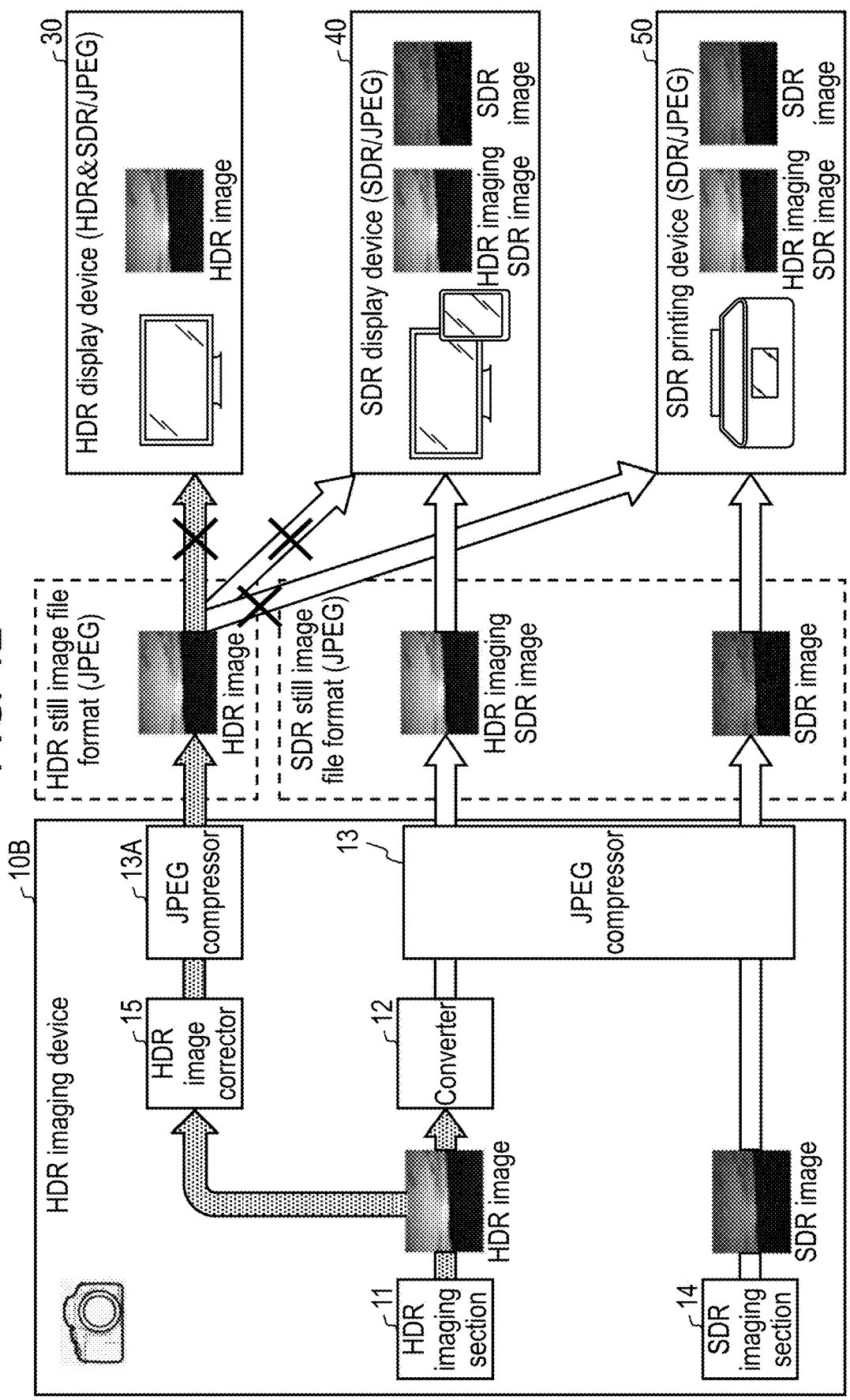
FIG. 12 is an explanatory view of an HDR still image file format.

FIG. 12 is an explanatory view of the HDR still image file format.

HDR imaging device 10B depicted in FIG. 12 includes HDR imaging section 11, SDR imaging section 14, converter 12, JPEG compressor 13, HDR image corrector 15, and JPEG compressor 13A.

The HDR still image file format does not have a widely spread file format like JPEG as an example of the SDR still image file format.

The file format for storage of HDR image data is required to have a color space extended to the color space according to bt.2020 and cover a wide luminance range. An HDR image is desirably adaptive to display in tones of at least 10 bits and preferably 12 bits or more, for inhibition of banding and the like appreciable in a still image. Meanwhile, the JPEG file format is restricted to SDR, the color space defined by sRGB, and 8-bit tones.

In a case where a JPEG-based file format is adopted as a file format for storage of HDR still image data, the JPEG file format can be made to have the color space defined by bt.2020, and can be extended to HDR and be compressed. It is thus technically possible to store HDR still image data in the JPEG-based file format. FIG. 12 exemplifies a case where JPEG compressor 13A in HDR imaging device 10B adopts the JPEG-based file format as a file format for storage of HDR still image data. The JPEG-based file format has, however, image quality problems such as banding due to insufficient tone display capability. The JPEG-based file format is not practically adopted as a file format for storage of HDR still image data.

Adoption of the JPEG file format for storage of HDR still image data has the problems described above. There is no potent example of the HDR still image file format. HDR display device 30 accordingly does not support the HDR still image file format.

Consideration will be made of a file format for storage of two types of data, namely, SDR still image data and HDR still image data.

Figure 13:
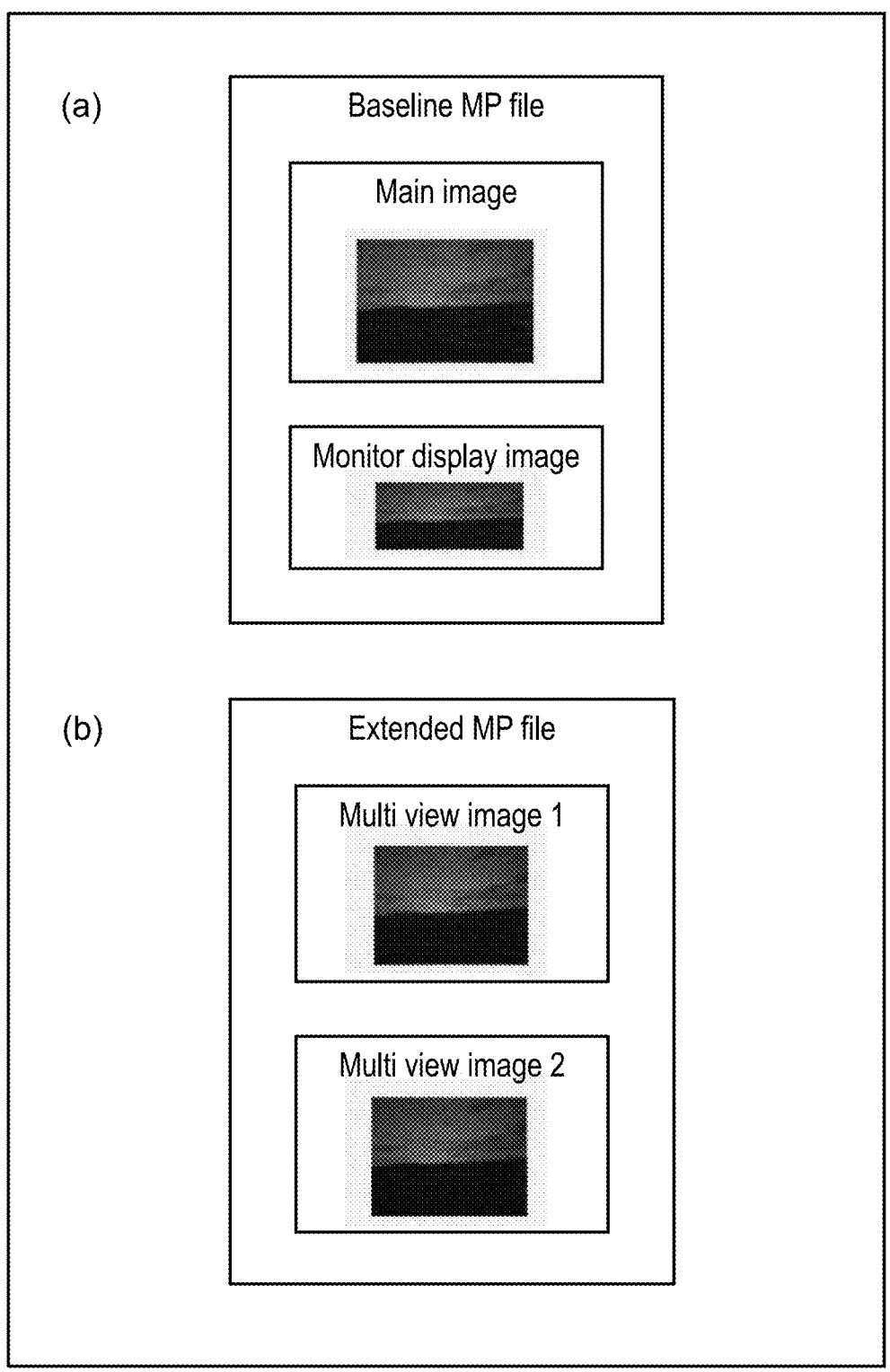
FIG. 13 is an explanatory view of a multi picture format.

FIG. 13 is an explanatory view of a multi picture format.

The multi picture format is provided as a format enabling storage of a plurality of picture data in a single file. The multi picture format enables a main image (HDR still image data) and a still image (hereinafter, also called a monitor display image) obtained by sizing the main image to be suitably displayed on a monitor of a television set or the like (SDR still image data), to be recorded in association with each other. The multi picture format also enables a plurality of still image data in separate files like multi view images (stereoscopic images) to be recorded in association with one another in a single file.

The multi picture format has two systems, namely, a Baseline MP file depicted in a part (a) of FIG. 13 and an Extended MP file depicted in a part (b) of FIG. 13.

The Baseline MP file depicted in the part (a) of FIG. 13 enables the main image (HDR still image data) and the monitor display image (SDR still image data) to be recorded in association with each other in the single file. The Baseline MP file has ".JPG" as an extension. The Baseline MP file enables reproduction of the monitor display image associated with the main image with use of conventional equipment or conventional software, as well as simple display of the main image (HDR still image data) on an HDR display device. The Baseline MP file advantageously enables reproduction of the monitor display image (i.e. SDR still image data) associated with the main image and stored for compatibility, with use of an existing display device and an existing printing device. Meanwhile, image editing software may falsely recognize the Baseline MP file as an ordinary JPEG file and delete second image data (HDR still image data). This is because the Baseline MP file stores two types of data in the single file but has the extension ".JPG" of a JPEG file for storage of one type of data in a single file. Image editing software configured to edit the multi picture format does not have the problem described above.

The Extended MP file depicted in the part (b) of FIG. 13 enables two multi view images (multi view image 1 and multi view image 2) for stereoscopic vision or the like to be recorded in association with each other in a single file. The Extended MP file is defined as a file format having a novel extension for prevention of loss of either one of the images reproduced, stored, or the like with use of conventional equipment or conventional software. The Extended MP file is advantageous because the Extended MP file stores two types of data in the single file conforming to a JPEG file but does not have the extension ".JPG" of the JPEG file. This file cannot be edited with use of image editing software other than image editing software adaptive to the multi picture format. Image editing software is thus less likely to falsely recognize the Extended MP file as an ordinary JPEG file and delete second image data, unlike the Baseline MP file. The Extended MP file has the extension different from the extension of a JPEG file and disadvantageously cannot be reproduced by an existing display device or an existing printing device.

Figure 14:
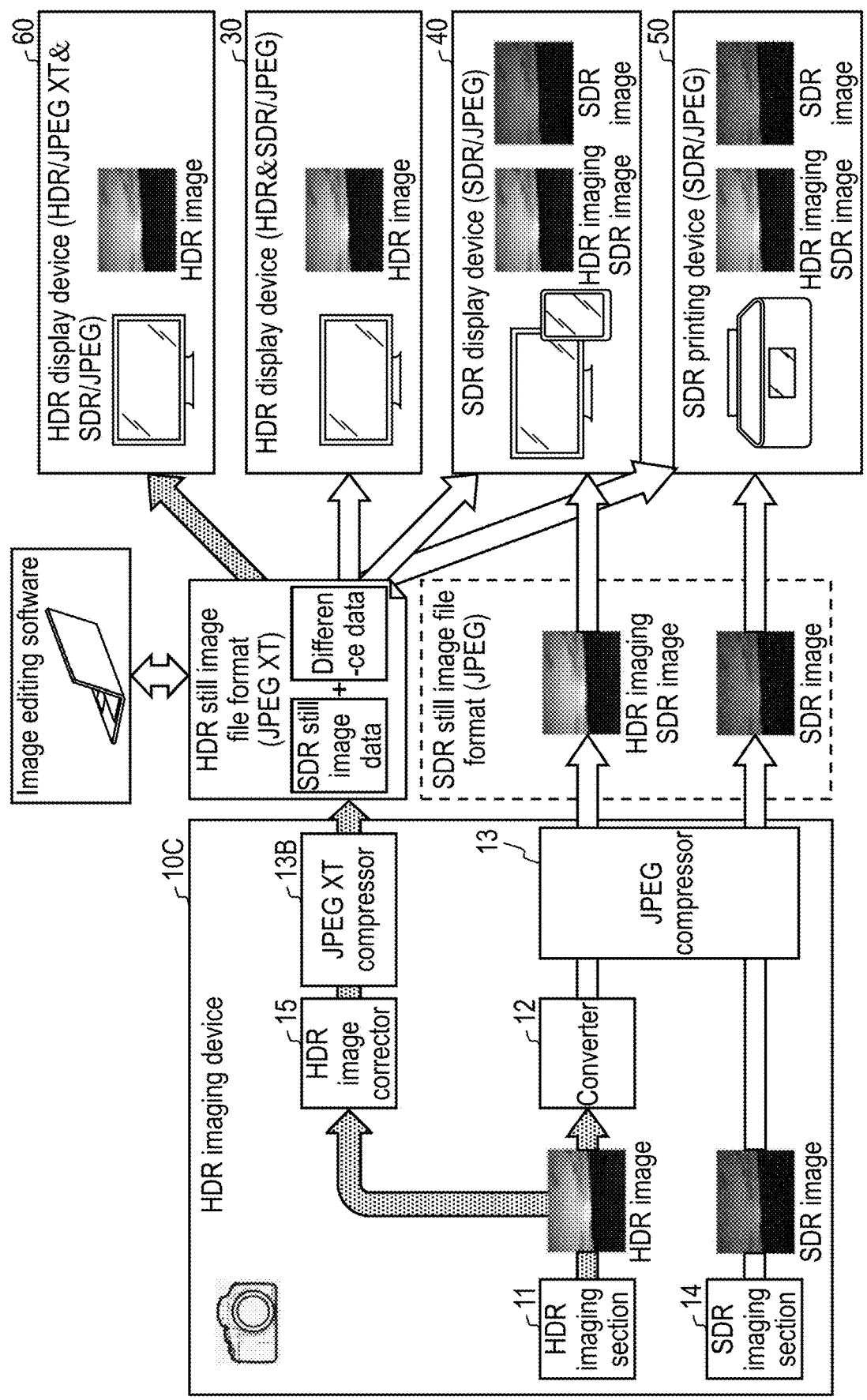
FIG. 14 is an explanatory view of a JPEG XT system for treatment of JPEG data and HDR extension difference data in association with each other.

FIG. 14 is an explanatory view of a JPEG XT system for treatment of JPEG data and HDR extension difference data in association with each other.

HDR imaging device 10C depicted in FIG. 14 includes HDR imaging section 11, SDR imaging section 14, converter 12, JPEG compressor 13, HDR image corrector 15, and JPEG XT compressor 13B.

Examples of a standard for an HDR still image include JPEG XT (ISO 18477). This standard defines a system for treatment in association with each other, of JPEG data storing SDR still image data and HDR extension difference data. In HDR imaging device 10C conforming to this standard, JPEG XT compressor 13B applies JPEG XT compression to HDR image data subjected to HDR image correction by HDR image corrector 15. HDR imaging device 10C thus obtains SDR still image data (JPEG) for reproduction of an SDR image and difference data for HDR still image generation.

JPEG XT advantageously achieves use of SDR still image data by a device configured to reproduce existing JPEG data. In other words, JPEG XT allows a device configured to reproduce existing JPEG data to reproduce SDR still image data.

A display device or a printing device needs to combine the difference data for HDR still image generation and the SDR still image data to reproduce an HDR still image according to JPEG XT. The display device or the printing device is required to execute unique processing for the HDR still image file format according to JPEG XT different from the ordinary HDR display function. JPEG XT disadvantageously fails to allow an existing HDRTV (e.g. HDR display device 30 depicted in FIG. 14) to reproduce data including difference data for HDR still image generation according to JPEG XT. In other words, an existing display device or an existing printing device can reproduce only an SDR still image file according to JPEG XT. An HDR still image according to JPEG XT can thus be reproduced (displayed) only by a display device adaptive to reproduction of the HDR still image file format according to JPEG XT (in other words, a display device configured to execute unique processing for reproduction of the HDR still image file format according to JPEG XT different from the ordinary HDR display function, such as HDR display device 60 depicted in FIG. 14). For generation of a JPEG XT file, an imaging device (e.g. HDR imaging device 10C) also needs to have a function of executing unique processing such as JPEG XT compression (e.g. JPEG XT compressor 13B). When image editing software or the like edits SDR still image data (JPEG data) in a JPEG XT file and having compatibility with an existing display device and an existing printing device, image editing software may delete difference data for HDR still image generation. The difference data for HDR still image generation in the JPEG XT file is of a differential type and is thus difficult to be edited as an HDR picture. When the SDR still image data in the JPEG XT file is edited with use of image editing software or the like, a display device adaptive to reproduction of an HDR still image file format according to JPEG XT (e.g. HDR display device 60 depicted in FIG. 14) may fail to reproduce the difference data for HDR still image generation in combination with the SDR still image data.

JPEG XT has many problems to be solved and is rarely applied to HDR imaging devices and HDR display devices.

There is thus demanded a data file format for easy treatment of two types of still image data, namely, SDR still image data and HDR still image data.

Described below is an image processing device configured to generate such a data format.

An exemplary embodiment will now be described in detail with reference to the drawings where appropriate. The description may not include details beyond necessity. For example, already well-known matters may not be described in detail, and substantially same configurations may not be described repeatedly. This prevents the following description from being unnecessarily redundant and facilitates comprehension by those skilled in the art.

The accompanying drawings and the following description are provided to help those skilled in the art to fully comprehend the present disclosure and are not intended to limit the subject matter recited in the patent claims.

The drawings have depiction that are not necessarily accurate, and are provided as schematic views appropriately simplified or the like for easier comprehension of the present disclosure. Substantially same constituent elements in the drawings are denoted by an identical reference mark and may not be described or may be described simply.

1. First Exemplary Embodiment

Figure 15:
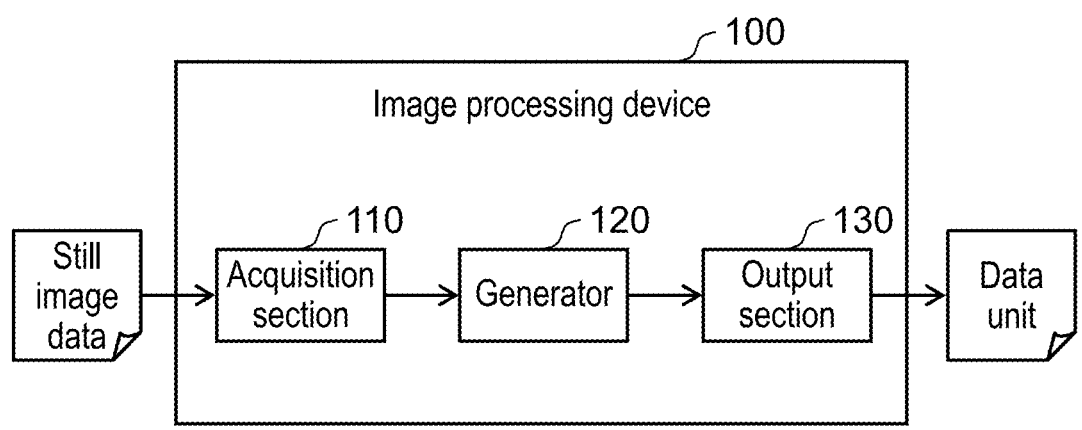
FIG. 15 is a block diagram schematically depicting an exemplary configuration of an image processing device according to a first exemplary embodiment.

FIG. 15 is a block diagram schematically depicting an exemplary configuration of image processing device 100 according to the first exemplary embodiment.

Image processing device 100 includes acquisition section 110, generator 120, and output section 130. Image processing device 100 can be incorporated in an imaging device or can be provided as an independent device.

Acquisition section 110 is configured to acquire still image data obtained through imaging by an imaging section (not depicted) such as an image sensor. The still image data is imaged to include lightness in a wide range from low luminance to high luminance, and is thus generated as HDR image data having luminance from 0 nits to 10,000 nits or the like. Acquisition section 110 can be embodied by a processor configured to execute a predetermined program (a program prepared for execution of the above various processing) and a memory storing the predetermined program. Acquisition section 110 can alternatively be embodied by a dedicated circuit configured to execute the above various processing.

Generator 120 is configured to generate a logically single data unit from the still image data acquired by acquisition section 110. Such a logically single data unit according to the present exemplary embodiment indicates single data including first still image data and second still image data different from each other in luminance dynamic range and reproducible independently from each other.

The logically single data unit will specifically be exemplified with reference to FIG. 16 to FIG. 19.

Figure 16:
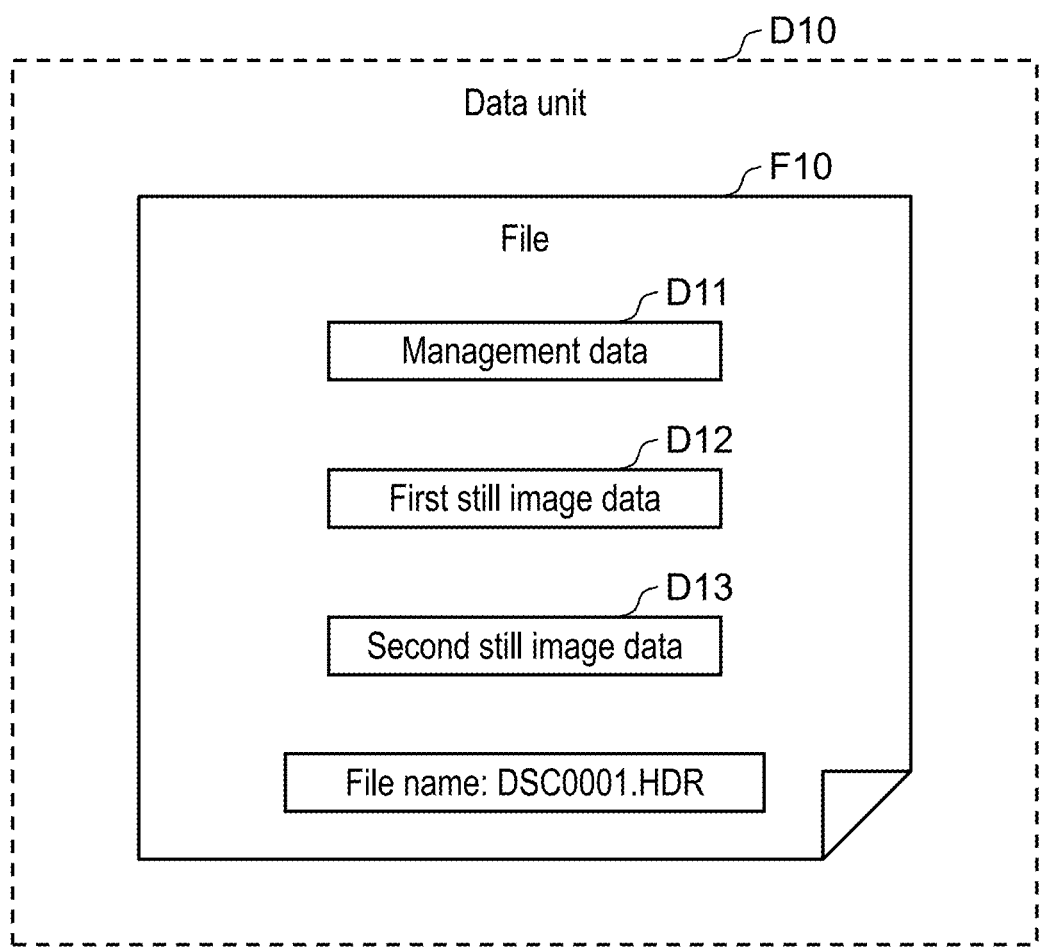
FIG. 16 is a diagram schematically depicting an exemplary logically single data unit having a single file including two types of still image data.

FIG. 16 is a diagram schematically depicting exemplary logically single data unit D10 having single file F10 including two types of still image data (first still image data D12 and second still image data D13).

Figure 17:
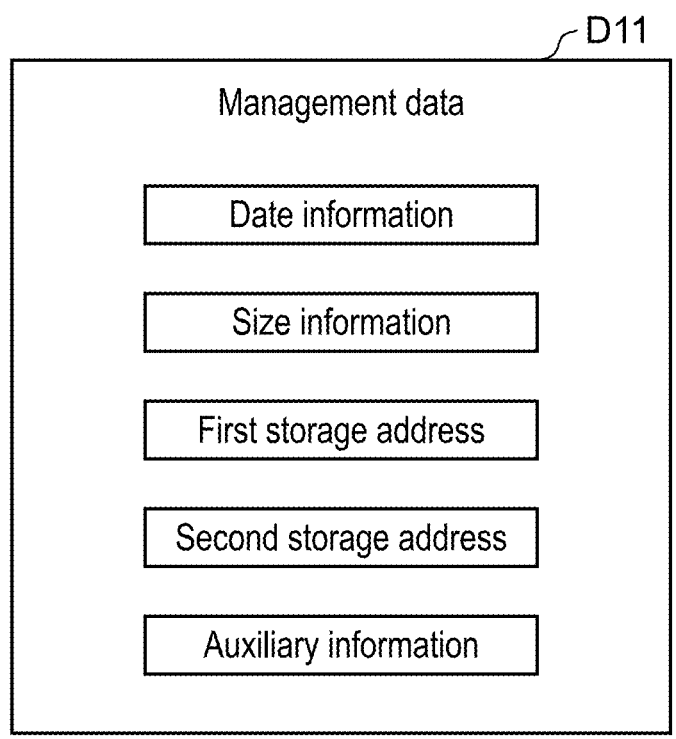
FIG. 17 is a diagram schematically depicting exemplary information included in management data.

FIG. 17 is a diagram schematically depicting exemplary information included in management data D11.

Figure 18:
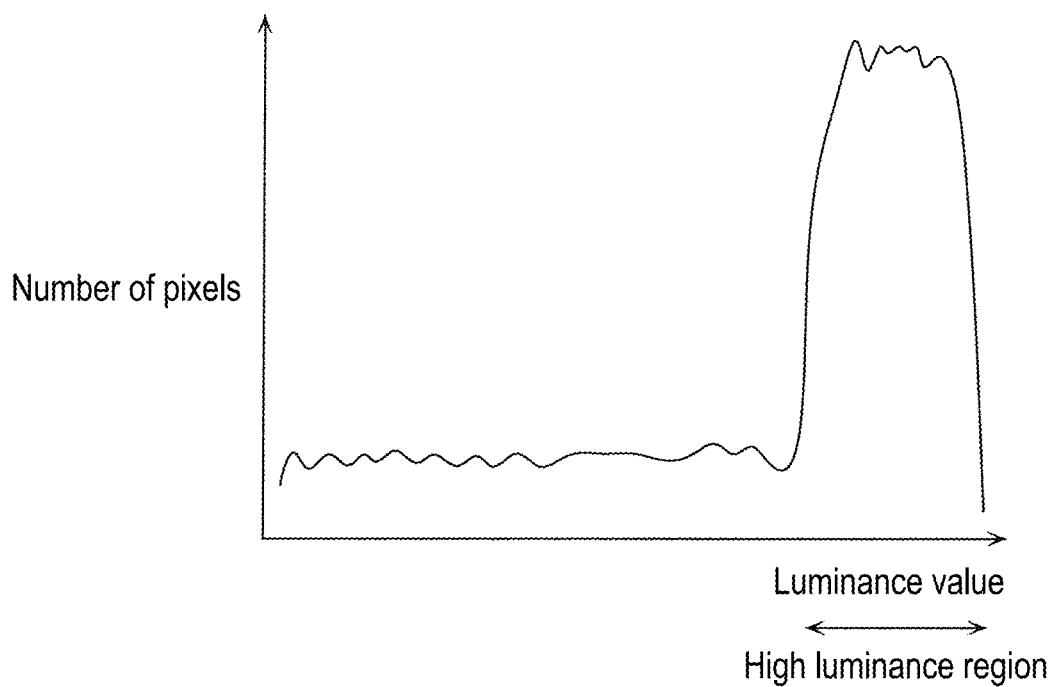
FIG. 18 is a histogram indicating exemplary relation between a luminance value of each pixel configuring a still image according to first still image data and a number of pixels having each luminance value.

FIG. 18 is a histogram indicating exemplary relation between a luminance value of each pixel configuring a still image according to first still image data D12 and a number of pixels having each luminance value.

Figure 19:
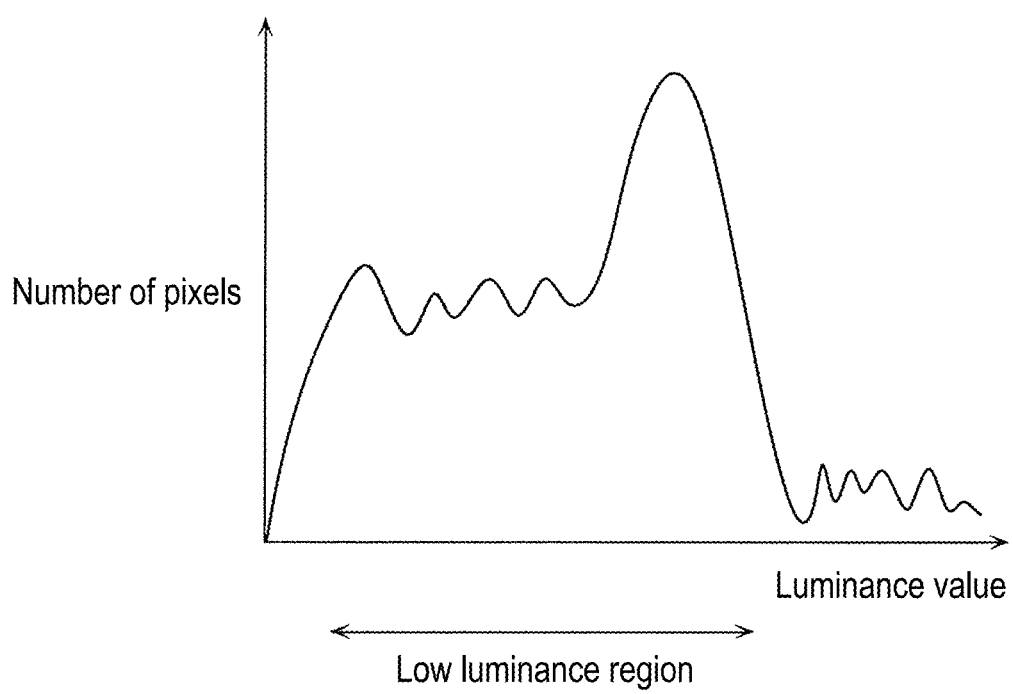
FIG. 19 is a histogram indicating other exemplary relation between the luminance value of each pixel configuring the still image according to the first still image data and the number of pixels having each luminance value.

FIG. 19 is a histogram indicating other exemplary relation between the luminance value of each pixel configuring the still image according to first still image data D12 and the number of pixels having each luminance value.

FIG. 18 and FIG. 19 each have a transverse axis indicating a luminance value and an ordinate axis indicating the number of pixels.

Figure 20:
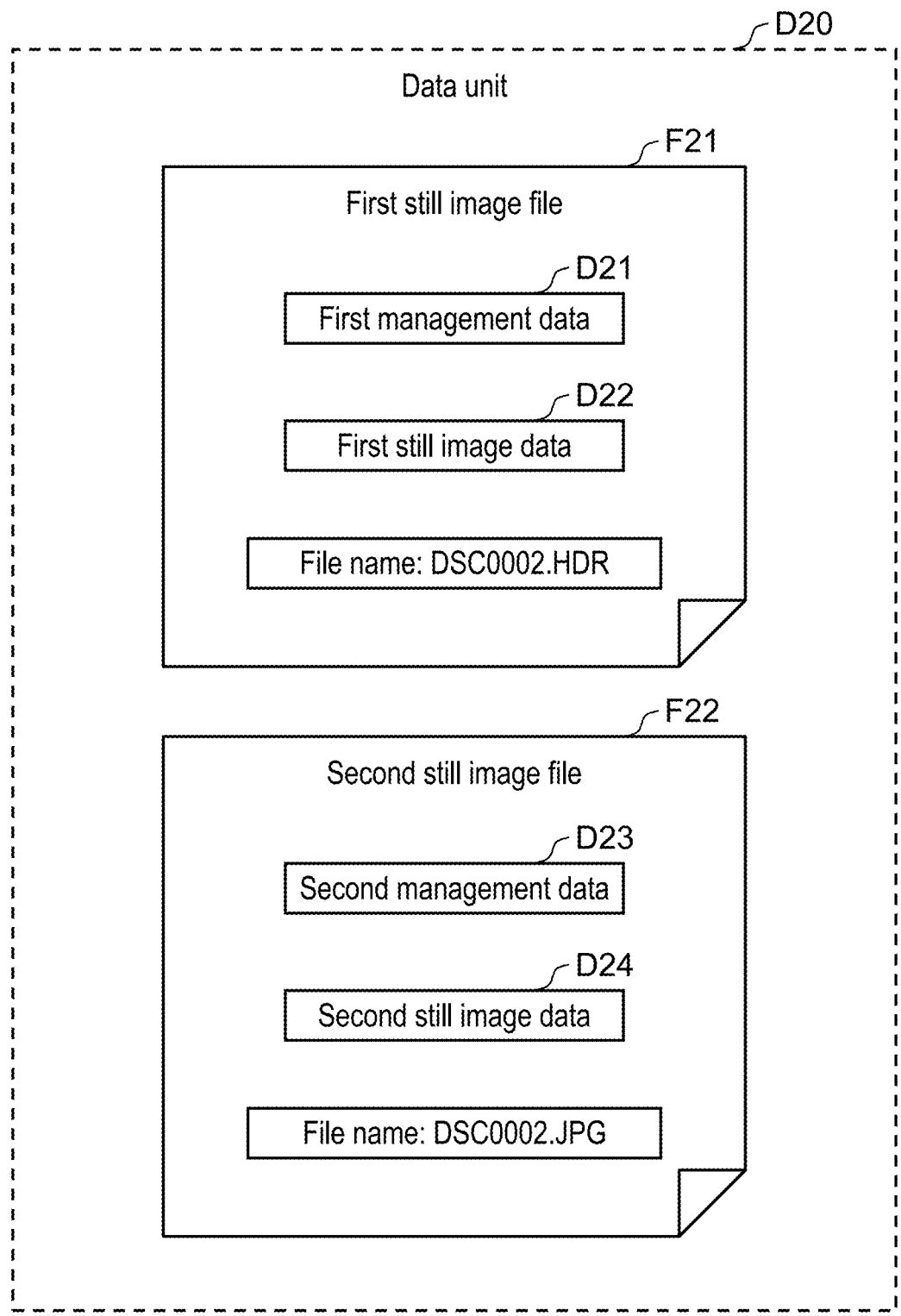
FIG. 20 is a diagram schematically depicting an exemplary logically single data unit having two files.

FIG. 20 is a diagram schematically depicting exemplary logically single data unit D20 having two files (first still image file F21 and second still image file F22). FIG. 20 exemplifies a case where first still image file F21 includes first still image data D22 and second still image file F22 includes second still image data D24.

Figure 21:
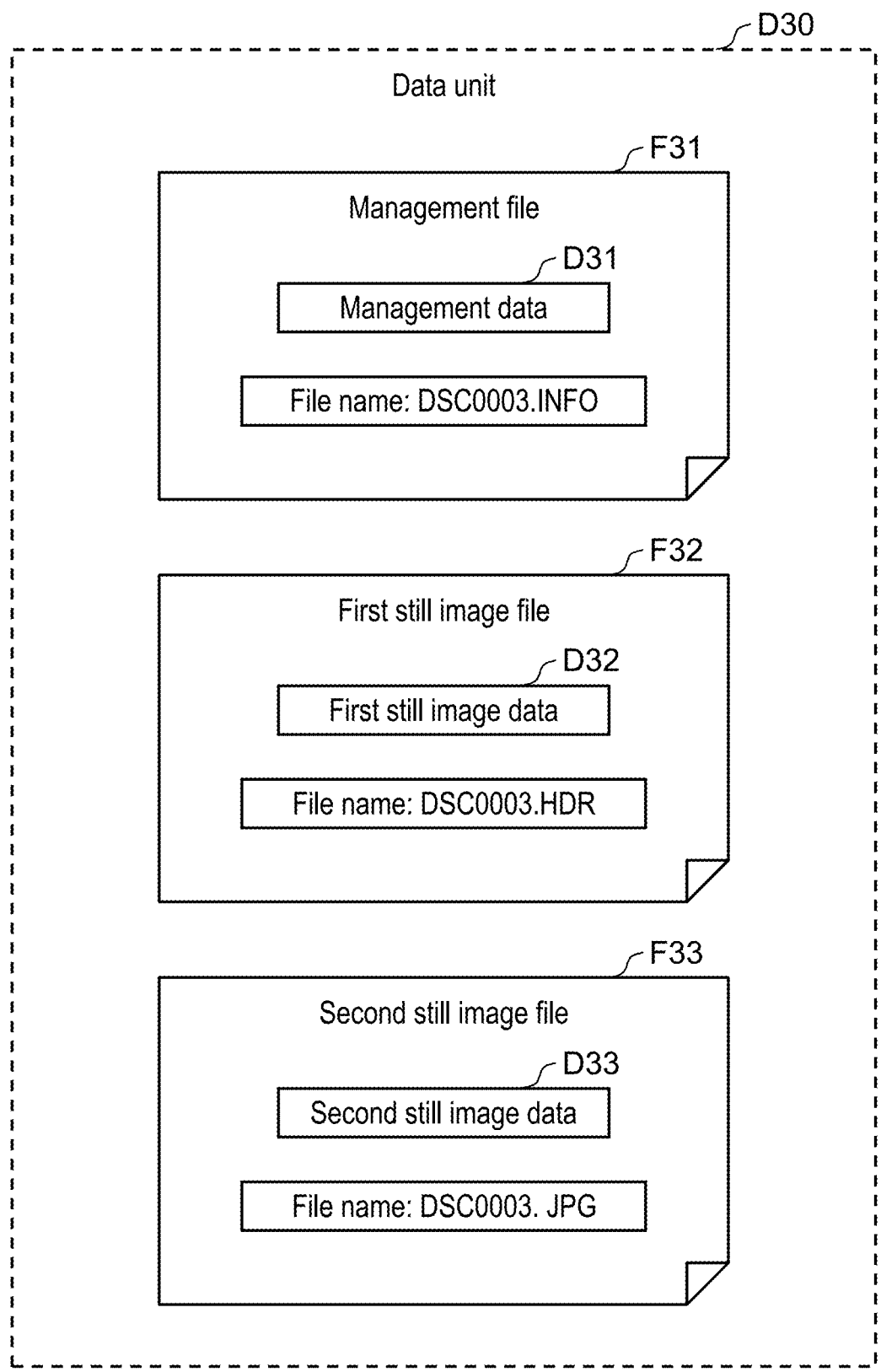
FIG. 21 is a diagram schematically depicting another exemplary logically single data unit having two files.

FIG. 21 is a diagram schematically depicting another exemplary logically single data unit D30 having two files (first still image file F32 and second still image file F33). FIG. 21 exemplifies a case where first still image file F32 includes first still image data D32 and second still image file F33 includes second still image data D33.

Generator 120 generates a logically single data unit. As exemplified in FIG. 16, generator 120 can generate, as data unit D10, single file F10 including first still image data D12 and second still image data D13. Data unit D10 generated by generator 120 is configured by single file F10 in this case. File F10 includes management data D11, first still image data D12, and second still image data D13. First still image data D12 can be HDR image data whereas second still image data D13 can be SDR image data. File F10 is named as "DSC0001.HDR" or the like. Generator 120 can further supplement data unit D10 depicted in FIG. 16 with auxiliary information (see FIG. 17). The auxiliary information can include information indicating that an image obtained by reproduction of first still image data D12 is higher in quality than an image obtained by reproduction of second still image data D13.

Management data D11 is provided for management of first still image data D12 and second still image data D13. As exemplified in FIG. 17, management data D11 includes date information, size information, a first storage address, a second storage address, and the auxiliary information.

The date information indicates a date of imaging each of a still image as an original of first still image data D12 and a still image as an original of second still image data D13. The size information indicates size (resolution) of a still image according to first still image data D12 and size (resolution) of a still image according to second still image data D13. The first storage address is information indicating an address of first still image data D12 stored in file F10. The second storage address is information indicating an address of second still image data D13 stored in file F10.

The auxiliary information will be described with reference to FIG. 18 and FIG. 19.

The auxiliary information can include luminance region information indicating whether or not the still image according to first still image data D12 has luminance prioritized in a high luminance region. As exemplified in FIG. 18, for an HDR still image having many luminance values distributed in the high luminance region, generator 120 can generate management data D11 including, as the auxiliary information, luminance region information indicating that many luminance values are distributed in the high luminance region.

The auxiliary information can alternatively include luminance region information indicating whether or not the still image according to first still image data D12 has luminance prioritized in a low luminance region. As exemplified in FIG. 19, for an HDR still image having many luminance values distributed in the low luminance region, generator 120 can generate management data D11 including, as the auxiliary information, luminance region information indicating that many luminance values are distributed in the low luminance region.

The high luminance region has luminance higher than luminance in the low luminance region. The high luminance region and the low luminance region can be set not to overlap each other, or can be set to have portions overlapped with each other. The high luminance region can be set to have luminance higher than an SDR highest luminance value. The low luminance region can be set to have luminance not exceeding the SDR highest luminance value.

Generator 120 can analyze first still image data D12 to specify a luminance region occupied by a number of pixels of at least a predetermined rate from the highest luminance value (or from the lowest luminance value) in the entire number of pixels configuring the still image according to first still image data D12, and generate management data D11 including, as the auxiliary information, luminance region information indicating the luminance region. The luminance region information can alternatively set by a user.

As exemplified in FIG. 20, generator 120 can alternatively generate, as data unit D20, an object including single first still image file F21 having first still image data D22, and second still image file F22 having second still image data D24 and a file name identical in body part (a file name excluding an extension) with first still image file F21. Data unit D20 generated by generator 120 includes two files in this case, namely, first still image file F21 and second still image file F22.

First still image file F21 includes first management data D21 and first still image data D22. First still image file F21 is named as "DSC0002.HDR" or the like. Second still image file F22 includes second management data D23 and second still image data D24. Second still image file F22 is named as "DSC0002.JPG" or the like. The body part (the file name excluding the extension) of the file name of first still image file F21 and the body part (the file name excluding the extension) of the file name of second still image file F22 are equally "DSC0002".

Similarly to first still image data D12, first still image data D22 is HDR image data. Similarly to second still image data D13, second still image data D24 is SDR image data.

First management data D21 includes information obtained by excluding the second storage address from management data D11 depicted in FIG. 17. Second management data D23 includes information obtained by excluding the first storage address from management data D11 depicted in FIG. 17.

FIG. 20 exemplifies first still image file F21 including first management data D21 and second still image file F22 including second management data D23. The present disclosure is, however, never limited to such an exemplary configuration. As exemplified in FIG. 21, generator 120 can still alternatively generate, as data unit D30, an object including single first still image file F32 having first still image data D32, second still image file F33 having second still image data D33 and a file name identical in body part (a file name excluding an extension) with first still image file F32, and management file F31 having management data D31 and a file name identical in body part (a file name excluding an extension) with first still image file F32. Data unit D30 generated by generator 120 includes three files in this case, namely, management file F31, first still image file F32, and second still image file F33.

Management file F31 includes management data D31. Management file F31 is named as "DSC0003.INFO" or the like. First still image file F32 includes first still image data D32. First still image file F32 is named as "DSC0003.HDR" or the like. Second still image file F33 includes second still image data D33. Second still image file F33 is named as "DSC0003.JPG" or the like. The body part (the file name excluding the extension) of the file name of management file F31, the body part (the file name excluding the extension) of the file name of first still image file F32, and the body part (the file name excluding the extension) of the file name of second still image file F33 are equally "DSC0003".

Management data D31 is substantially same as management data D11 depicted in FIG. 17. Similarly to first still image data D12, first still image data D32 is HDR image data. Similarly to second still image data D13, second still image data D33 is SDR image data.

Output section 130 depicted in FIG. 15 is configured to output a data unit generated by generator 120.

Figure 22:
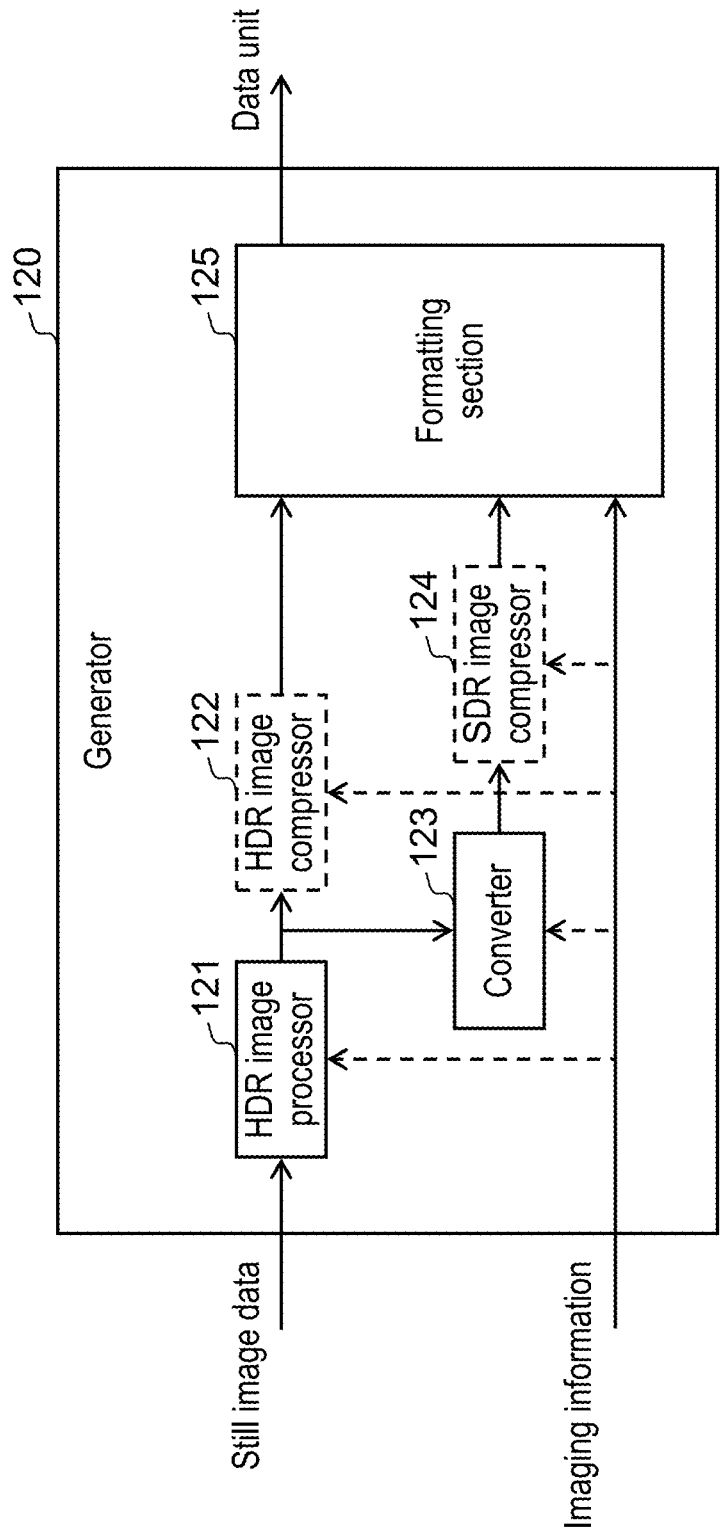
FIG. 22 is a block diagram schematically depicting an exemplary configuration of a generator according to the first exemplary embodiment.

FIG. 22 is a block diagram schematically depicting an exemplary configuration of generator 120 according to the first exemplary embodiment.

Generator 120 includes HDR image processor 121, converter 123, and formatting section 125. As depicted by broken lines in FIG. 22, generator 120 can further include at least one of HDR image compressor 122 or SDR image compressor 124. In other words, generator 120 can be configured by excluding at least one of HDR image compressor 122 or SDR image compressor 124.

HDR image processor 121 converts still image data (e.g. RAW data) acquired by acquisition section 110 to a 10-bit image with use of the HDR-EOTF (HDR image processing) for conversion of the still image data to HDR still image data having a dynamic range for HDR display. HDR image processor 121 outputs uncompressed HDR still image data.

HDR image compressor 122 compresses the uncompressed HDR still image data output from HDR image processor 121 to generate compressed HDR still image data. HDR image compressor 122 transmits, to formatting section 125, the compressed HDR still image data.

Converter 123 SDR converts the uncompressed HDR still image data to generate uncompressed SDR still image data.

SDR image compressor 124 compresses the uncompressed SDR still image data output from converter 123 to generate compressed SDR still image data. SDR image compressor 124 transmits, to formatting section 125, the compressed SDR still image data.

Formatting section 125 generates a logically single data unit including the HDR still image data compressed by HDR image compressor 122 and the SDR still image data compressed by SDR image compressor 124, and transmits the generated data unit to output section 130.

Still image data can include information (hereinafter, called imaging information) on imaging of an original image for the still image data. The imaging information includes a diaphragm value, shutter speed, International Organization for Standardization (ISO) sensitivity, picture control, and the like of a camera functioning as an imaging device. Generator 120 is optionally configured to cause each functional block in generator 120 to execute corresponding processing in accordance with the imaging information.

FIG. 22 exemplifies generator 120 including converter 123. The present disclosure is, however, not limited to such an exemplary configuration. Image processing device 100 can include generator 120A in place of generator 120. Generator 120A is different from generator 120 in that generator 120A includes SDR image processor 123A in place of converter 123.

Figure 23:
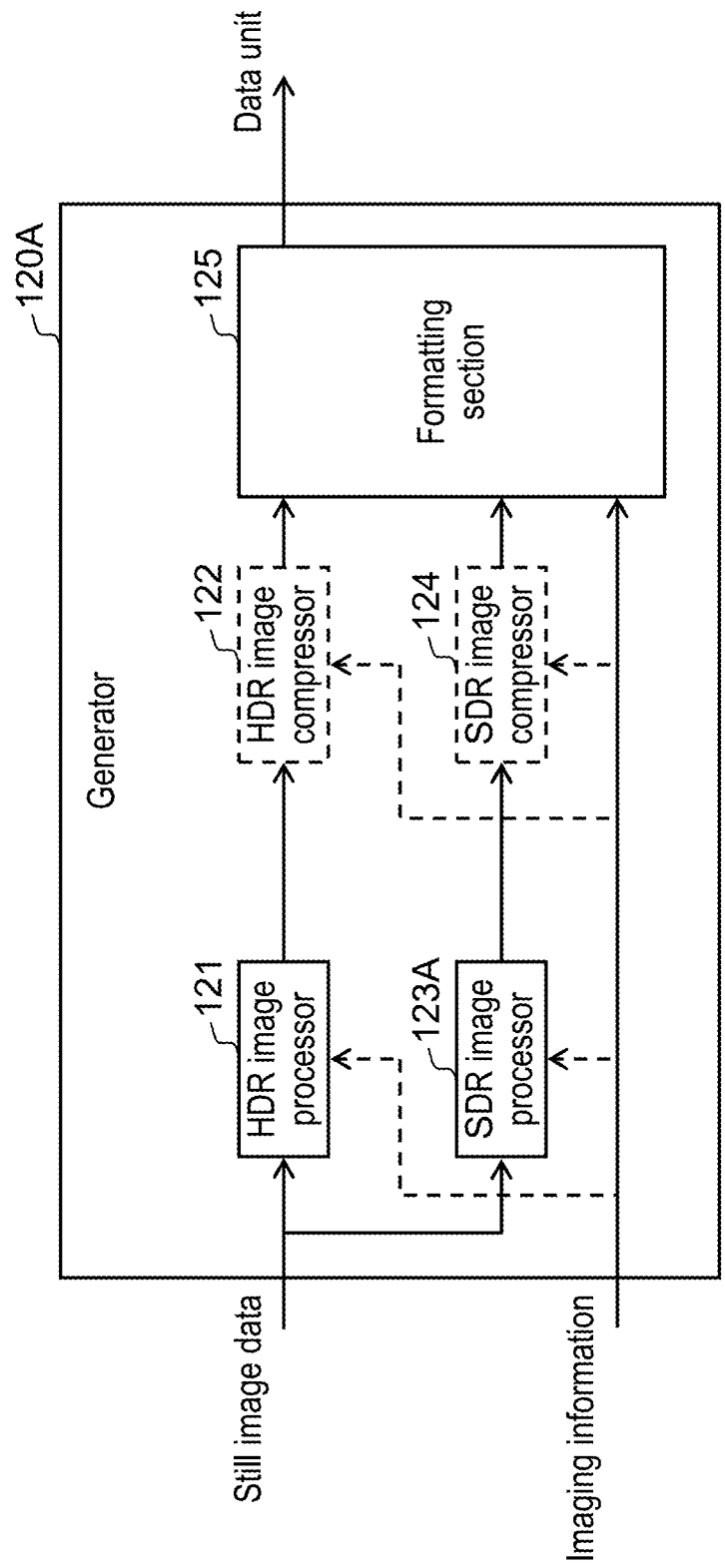
FIG. 23 is a block diagram schematically depicting another exemplary configuration of the generator according to the first exemplary embodiment.

FIG. 23 is a block diagram schematically depicting an exemplary configuration of generator 120A according to the first exemplary embodiment.

Generator 120A is different from generator 120 only in the configuration of SDR image processor 123A. Accordingly, only SDR image processor 123A will be described below.

SDR image processor 123A converts still image data (e.g. RAW data) acquired by acquisition section 110 to an 8-bit image with use of an SDR-electro-optical transfer function (SDR-EOTF) (SDR image processing) for conversion of the still image data to SDR still image data having a dynamic range for SDR display. SDR image processor 123A outputs uncompressed HDR still image data.

SDR image compressor 124 compresses the uncompressed SDR still image data output from SDR image processor 123A to generate compressed SDR still image data.

Similarly to generator 120, generator 120A is optionally configured to cause each functional block in generator 120A to execute corresponding processing in accordance with the imaging information.

Figure 24:
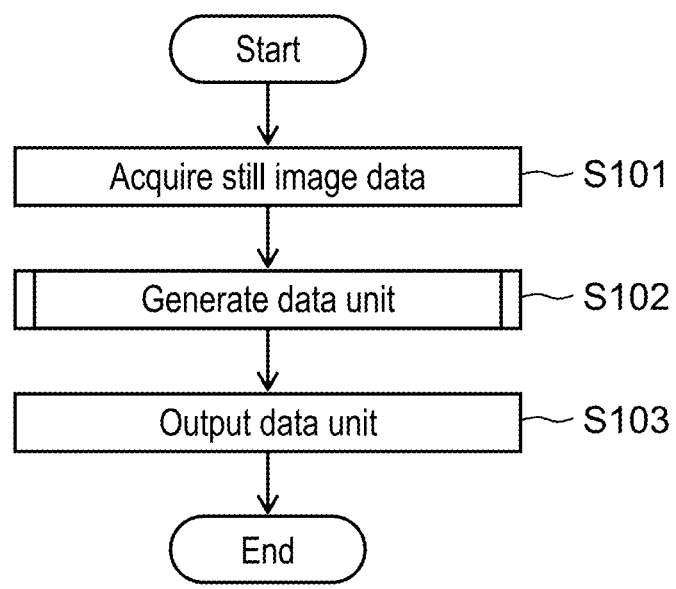
FIG. 24 is a flowchart depicting exemplary operation relevant to image processing executed by the image processing device according to the first exemplary embodiment.

FIG. 24 is a flowchart depicting exemplary operation relevant to image processing executed by image processing device 100 according to the first exemplary embodiment.

Acquisition section 110 in image processing device 100 acquires still image data (step S101).

Generator 120 generates a logically single data unit from still image data acquired by acquisition section 110 in step S101 (step S102). The logically single data unit includes HDR still image data and SDR still image data different from each other in luminance dynamic range and reproducible independently from each other.

Output section 130 outputs the logically single data unit generated by generator 120 in step S102 (step S103).

Generation processing in step S102 is executed differently between generator 120 depicted in FIG. 22 and generator 120A depicted in FIG. 23. The difference will be described below with reference to a flowchart.

Figure 25:
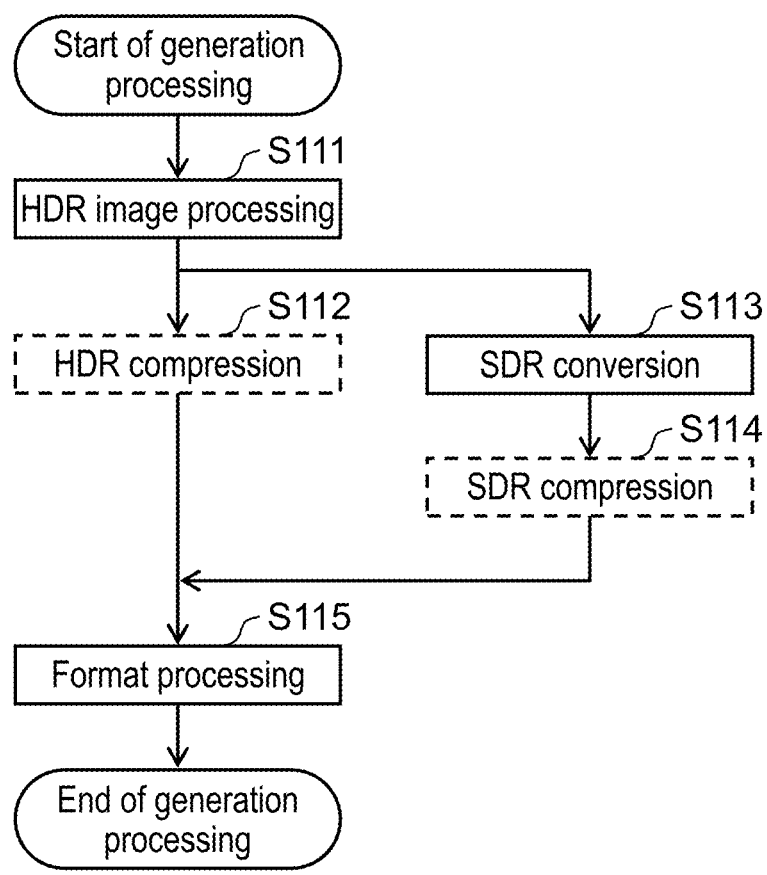
FIG. 25 is a flowchart depicting exemplary generation processing executed by the generator according to the first exemplary embodiment.

FIG. 25 is a flowchart depicting exemplary generation processing executed by generator 120 according to the first exemplary embodiment.

HDR image processor 121 applies predetermined image processing to the still image data acquired in step S101 to convert the still image data to HDR still image data (step S111). HDR image processor 121 outputs the HDR still image data (uncompressed HDR still image data).

HDR image compressor 122 compresses the uncompressed HDR still image data output from HDR image processor 121 in step S111 (step S112). Step S112 is not necessarily executed. FIG. 25 accordingly depicts step S112 by a broken line.

Converter 123 SDR converts the uncompressed HDR still image data output from HDR image processor 121 in step S111 (step S113). Converter 123 outputs uncompressed SDR still image data obtained by the SDR conversion.

SDR image compressor 124 compresses the uncompressed SDR still image data output from converter 123 in step S113 (step S114). Step S114 is not necessarily executed. FIG. 25 accordingly depicts step S114 by a broken line.

Formatting section 125 generates a logically single data unit including the compressed HDR still image data generated by HDR image compressor 122 in step S112 (or the uncompressed HDR still image data output from HDR image processor 121 in step S111) and the compressed SDR still image data generated by SDR image compressor 124 in step S114 (or the uncompressed SDR still image data output from converter 123 in step S113) (step S115). As described above, at least one of step S112 or step S114 is not necessarily executed in the flowchart in FIG. 25 executed by generator 120.

Figure 26:
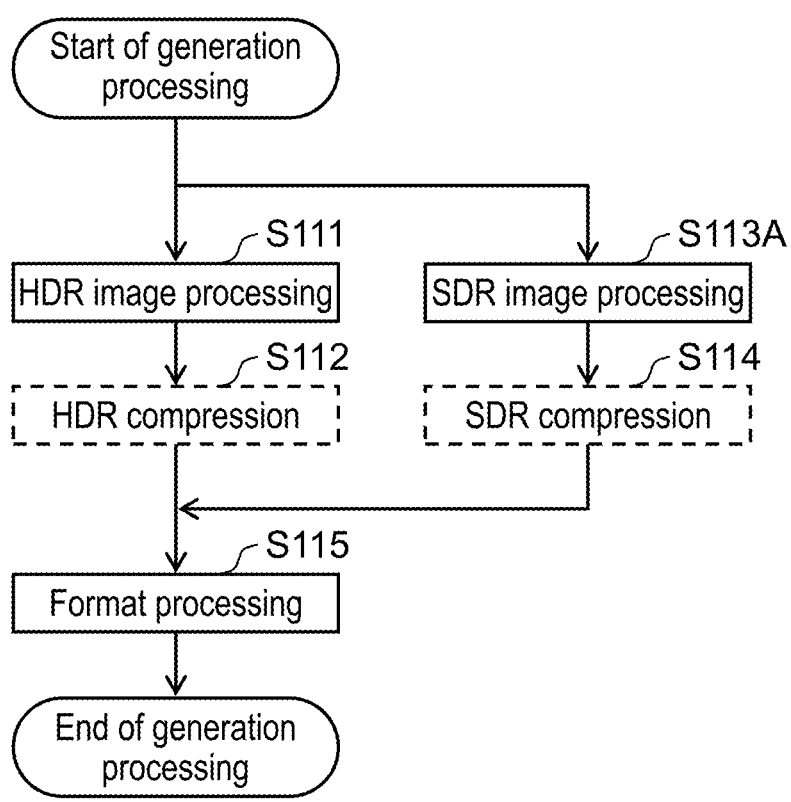
FIG. 26 is a flowchart depicting other exemplary generation processing executed by the generator according to the first exemplary embodiment.

FIG. 26 is a flowchart depicting other exemplary generation processing executed by generator 120A according to the first exemplary embodiment.

Generation processing depicted in the flowchart of FIG. 26 is different from generation processing depicted in the flowchart of FIG. 25 only in execution of step S113A instead of step S113. Only step S113A will thus be described below.

SDR image processor 123A in generator 120A applies predetermined image processing to the still image data acquired in step S101 to convert the still image data to SDR still image data (step S113A). SDR image processor 123A outputs the SDR still image data (uncompressed SDR still image data).

Step S114 or step S115 is executed subsequently to step S113A, as in the flowchart of FIG. 25.

Operation of the HDR imaging device including image processing device 100 will be specifically exemplified. In the following, those already described constituent elements will be denoted by the identical reference mark and will not be described repeatedly.

1-1-1. Example 1

Figure 27:
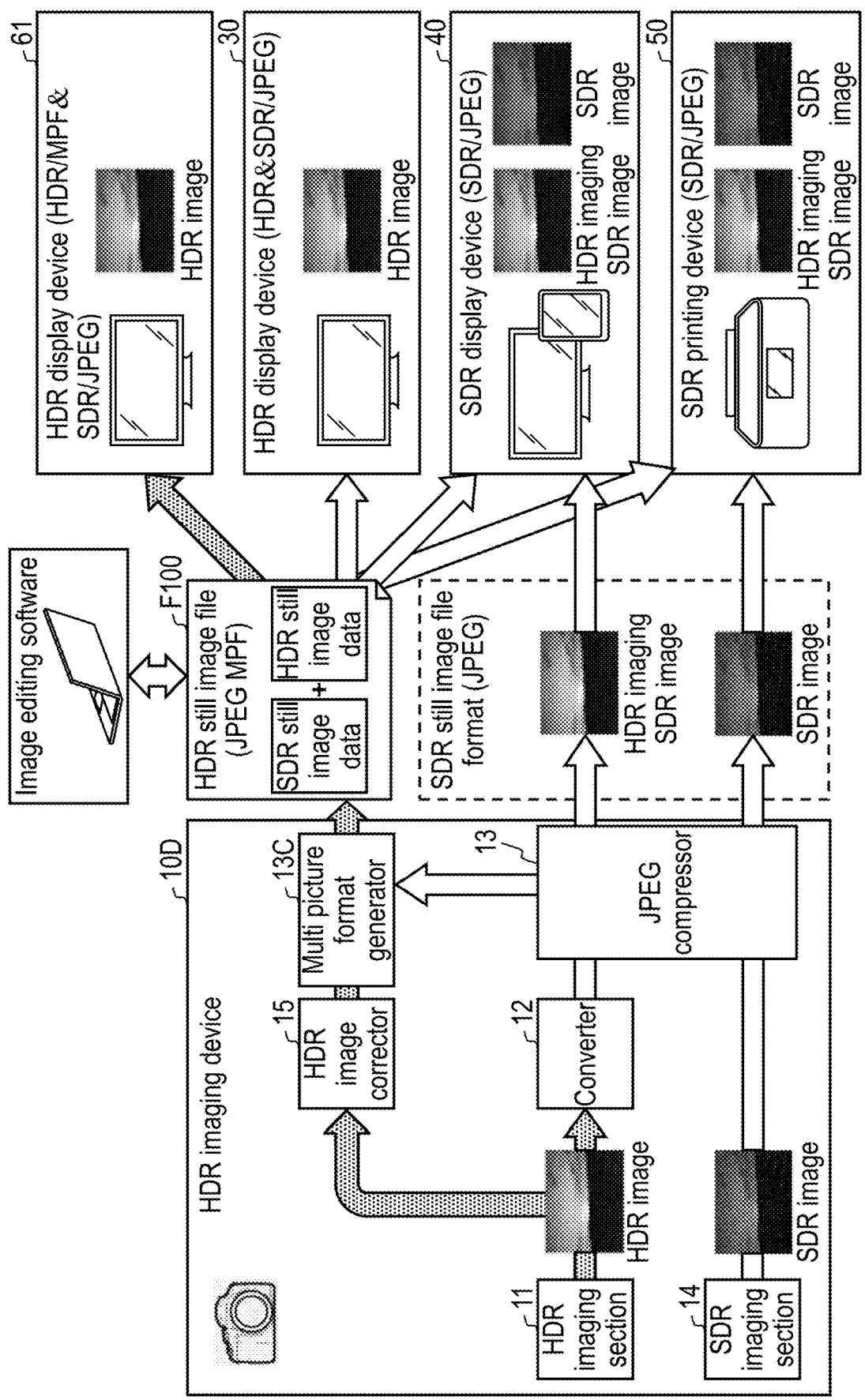
FIG. 27 is an explanatory view of an example 1 of the first exemplary embodiment.

FIG. 27 is an explanatory view of the example 1 of the first exemplary embodiment. The example 1 relates to an exemplary configuration for generation of a single file including HDR still image data and SDR still image data in accordance with a multi picture format system.

The example 1 provides HDR imaging device 10D that can be configured to generate a single file including HDR still image data and SDR still image data in accordance with the multi picture format system. As depicted in FIG. 27, HDR imaging device 10D includes HDR imaging section 11, converter 12, JPEG compressor 13, multi picture format generator 13C, SDR imaging section 14, and HDR image corrector 15. Among the constituent elements of HDR imaging device 10D, converter 12, JPEG compressor 13, multi picture format generator 13C, and HDR image corrector 15 correspond to generator 120 and output section 130 in image processing device 100 described with reference to FIG. 15 and FIG. 22.

HDR imaging section 11 images in the HDR shooting mode to generate an HDR image (an HDR still image). HDR imaging section 11 can be embodied by a lens, an image sensor, a processor, a memory, and the like.

Converter 12 is a processor corresponding to converter 123 (see FIG. 22) in generator 120 of image processing device 100. Converter 12 SDR converts uncompressed HDR still image data output from HDR imaging section 11 to generate uncompressed SDR still image data. Converter 12 transmits the uncompressed SDR still image data thus generated to JPEG compressor 13. Converter 12 can be embodied by a processor, a memory, and the like.

JPEG compressor 13 is a processor corresponding to SDR image compressor 124 (see FIG. 22) in generator 120 of image processing device 100. JPEG compressor 13 JPEG compresses the uncompressed SDR still image data thus received to generate compressed SDR still image data. JPEG compressor 13 can be embodied by a processor, a memory, and the like.

HDR image corrector 15 is a processor corresponding to HDR image processor 121 (see FIG. 22) in generator 120 of image processing device 100.

HDR image corrector 15 generates, from RAW data obtained from HDR imaging section 11, uncompressed HDR still image data displayable by an HDRTV such as HDR display device 30 or HDR display device 61. HDR image corrector 15 can be embodied by a processor, a memory, and the like.

Multi picture format generator 13C is a processor corresponding to formatting section 125 (see FIG. 22) in generator 120 and output section 130 (see FIG. 15) of image processing device 100. Multi picture format generator 13C generate HDR still image file (JPEG MPF) F100 in the HDR still image file format, storing, in a single file, the uncompressed HDR still image data and the JPEG compressed SDR still image data in accordance with the multi picture format system. Multi picture format generator 13C then outputs generated HDR still image file F100. Multi picture format generator 13C can generate HDR still image file F100 with use of the compressed SDR still image data generated by JPEG compressor 13 from the SDR still image data output from converter 12, or the compressed SDR still image data generated by JPEG compressor 13 from the SDR still image data obtained through imaging by SDR imaging section 14.

HDR still image file F100 generated by multi picture format generator 13C is configured correspondingly to file F10 in data unit D10 depicted in FIG. 16 or the like. Multi picture format generator 13C can be embodied by a processor, a memory, and the like.

SDR imaging section 14 images in a conventional shooting mode (the SDR shooting mode) to generate an SDR image (SDR still image). SDR imaging section 14 can be embodied by a lens, an image sensor, a processor, a memory, and the like.

Each of the processors described above can alternatively be embodied by, in place of the processor and the memory, a dedicated circuit configured to execute corresponding one of the above various processing.

HDR still image file F100 stores two types of data, namely, SDR still image data (JPEG data for SDR compatibility) and HDR still image data. The HDR still image data corresponds to first still image data D12 depicted in FIG. 16 whereas the SDR still image data corresponds to second still image data D13 depicted in FIG. 16. HDR still image file F100 has ".JPG" as an extension. HDR still image file F100 can thus be reproduced (displayed or printed) by HDR display device 61 adaptive to the multi picture format, as well as by HDR display device 30, SDR display device 40, and SDR printing device 50 that are nonadaptive to the multi picture format.

The example 1 advantageously enables reproduction of SDR-JPEG (compressed SDR still image data generated by JPEG compressor 13) by a device configured to reproduce an existing JPEG file (e.g. SDR display device 40 or SDR printing device 50). The example 1 is further advantageous in that an existing HDRTV (e.g. HDR display device 30 or HDR display device 61) can be relatively easily equipped with a function of displaying HDR still image file F100. The example 1 is also advantageous in that an imaging device can relatively easily be configured to execute HDR dedicated processing.

The example 1 relates to HDR still image file F100 having the extension ".JPG". The present disclosure is, however, not limited to such an exemplary configuration. There can be generated a file according to the multi picture format system, having a new extension. As described earlier, HDR still image data may be deleted, by image editing software configured to edit a JPEG file, from a file that has the extension ".JPG" and can be edited by the image editing software. A file having such a new extension and storing two types of data, namely, HDR still image data and SDR still image data, can be edited only by dedicated image editing software configured to edit a file having the extension, with a smaller risk of deletion of the HDR still image data. The file according to the multi picture format system provided with the new extension is advantageous as described above. The file according to the multi picture format system provided with the new extension is, however, difficult to be reproduced by an existing device (e.g. SDR display device 40 or SDR printing device 50).

1-1-2. Example 2

Figure 28:
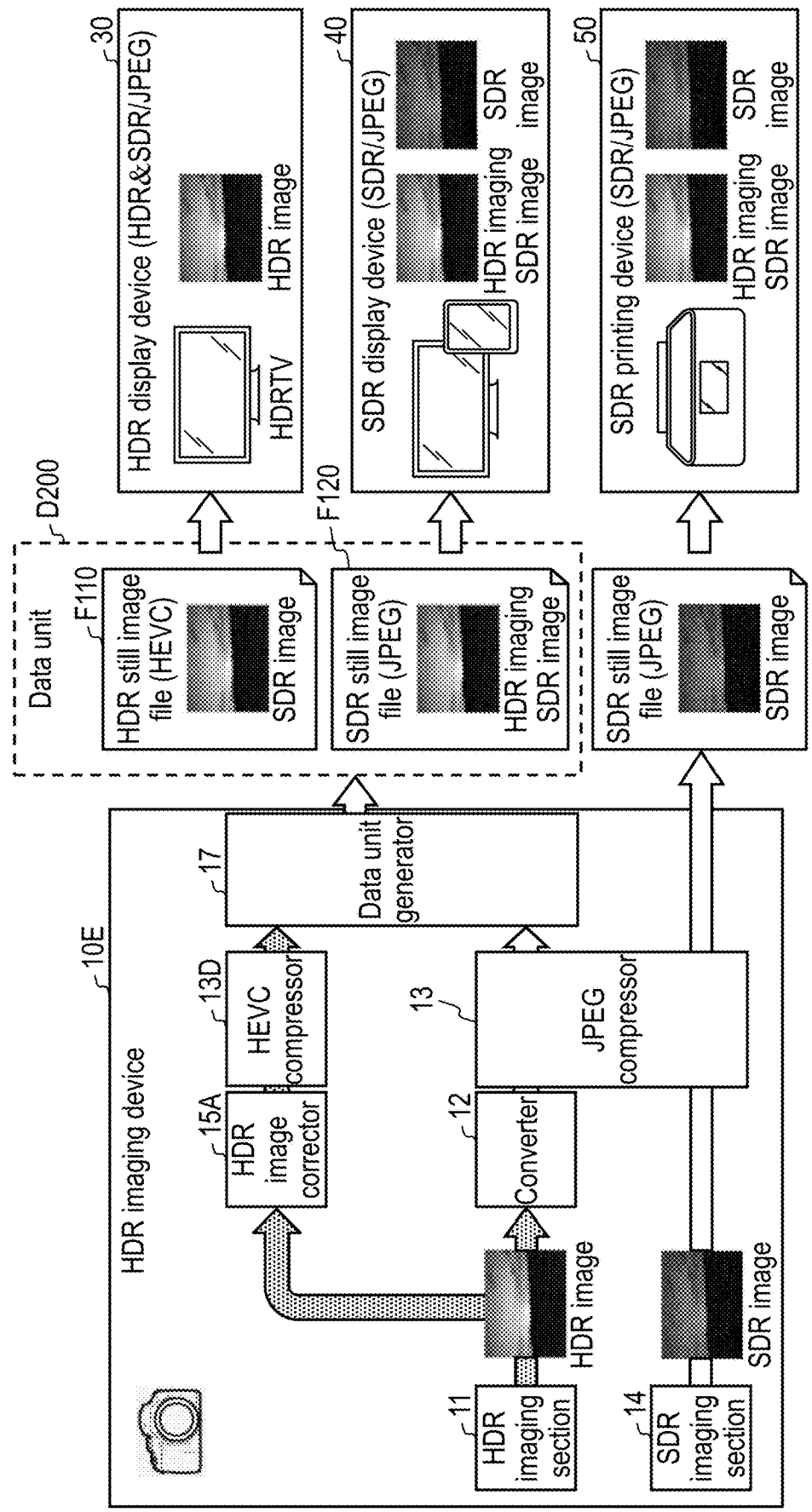
FIG. 28 is an explanatory view of an example 2 of the first exemplary embodiment.

FIG. 28 is an explanatory view of the example 2 of the first exemplary embodiment. The example 2 relates to an exemplary configuration for generation of a single data unit including HDR still image data and SDR still image data in accordance with a high efficiency video coding (HEVC) moving image file system.

The example 2 provides HDR imaging device 10E that can be configured to generate a single data unit including HDR still image data and SDR still image data according to the HEVC moving image file system. As depicted in FIG. 28, HDR imaging device 10E includes HDR imaging section 11, converter 12, JPEG compressor 13, HEVC compressor 13D, SDR imaging section 14, HDR image corrector 15A, and data unit generator 17. Among the constituent elements of HDR imaging device 10E, converter 12, JPEG compressor 13, HEVC compressor 13D, HDR image corrector 15A, and data unit generator 17 correspond to generator 120 and output section 130 in image processing device 100 described with reference to FIG. 15 and FIG. 22. HDR imaging section 11, converter 12, JPEG compressor 13, and SDR imaging section 14 depicted in FIG. 28 are configured substantially identically with the constituent elements named identically and depicted in FIG. 27, and will thus not be described repeatedly.

HDR image corrector 15A is a processor corresponding to HDR image processor 121 (see FIG. 22) in generator 120 of image processing device 100. HDR image corrector 15A converts RAW data obtained from HDR imaging section 11 to HDR image data displayable by an HDRTV such as HDR display device 30 with use of the HDR-EOTF to generate uncompressed HDR image data. HDR image corrector 15A can be embodied by a processor, a memory, and the like.

HEVC compressor 13D is a processor corresponding to HDR image compressor 122 (see FIG. 22) in generator 120 of image processing device 100. HEVC compressor 13D compresses the uncompressed HDR image data as a moving image in an HEVC format. HEVC compressor 13D can be embodied by a processor, a memory, and the like.

Data unit generator 17 is a processor corresponding to formatting section 125 (see FIG. 22) in generator 120 and output section 130 (see FIG. 15) of image processing device 100. Data unit generator 17 generates, as data unit D200, an object including HDR still image file F110 having HDR still image data compressed into an HEVC moving image format and SDR still image file F120 having SDR still image data JPEG compressed, and HDR still image file F110 and SDR still image file F120 have file names common in body part (a file name excluding an extension). Data unit generator 17 then outputs generated data unit D200.

Data unit generator 17 can generate data unit D200 with use of the compressed SDR still image data generated by JPEG compressor 13 from the SDR still image data output from converter 12, or the compressed SDR still image data generated by JPEG compressor 13 from the SDR still image data obtained through imaging by SDR imaging section 14.

Data unit D200 generated by data unit generator 17 is configured correspondingly to data unit D20 depicted in FIG. 20 or the like. Data unit generator 17 can be embodied by a processor, a memory, and the like.

Each of the processors described above can alternatively be embodied by, in place of the processor and the memory, a dedicated circuit configured to execute corresponding one of the above various processing.

The example 2 advantageously provides HDR still image data as a file according to the HEVC moving image system, so as to be displayable by an existing device (e.g. HDR display device 30). An imaging device provided with a recording function according to the HEVC moving image system can relatively easily achieve the configuration according to the example 2.

1-1-3. Example 3

Figure 29:
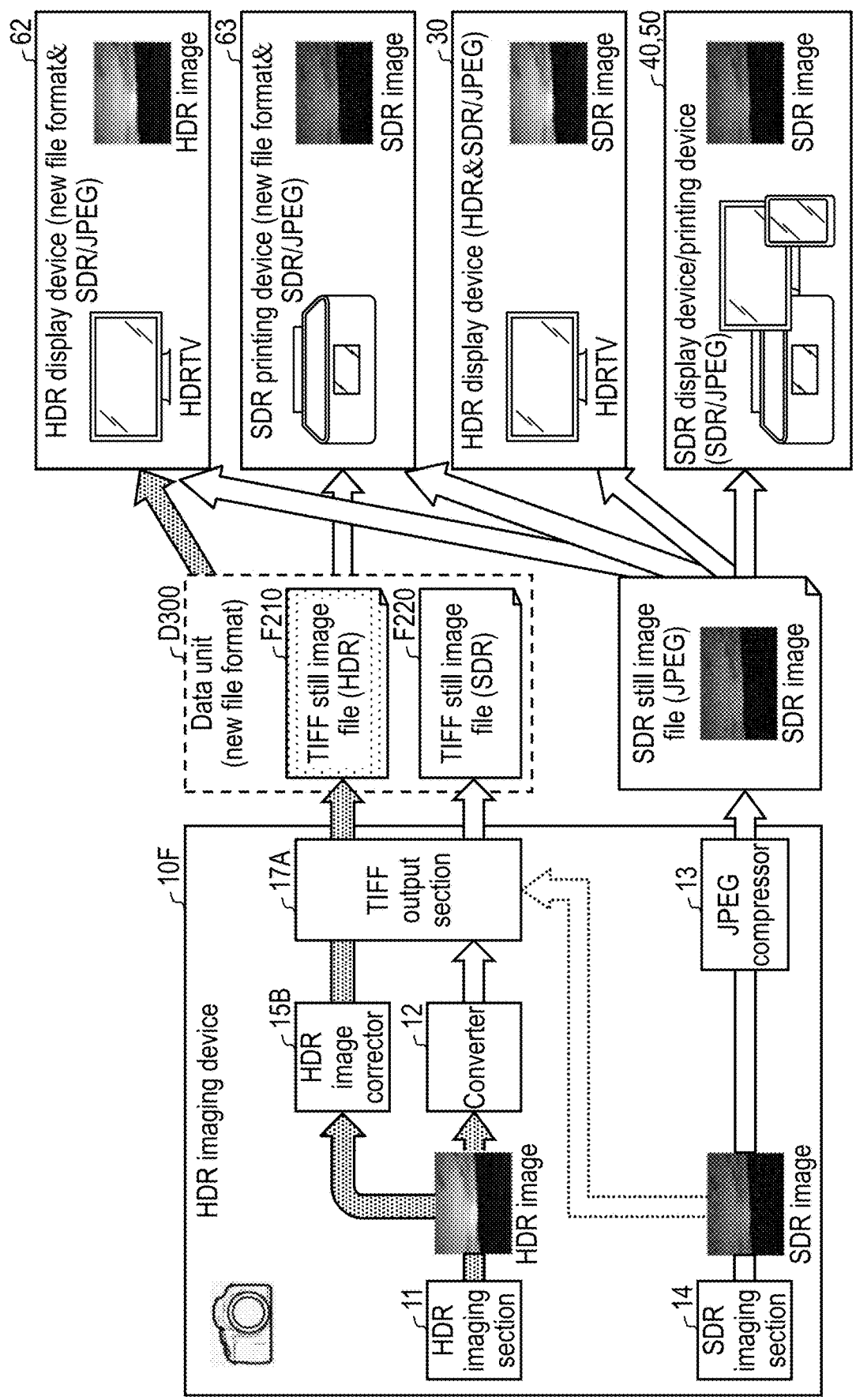
FIG. 29 is an explanatory view of an example 3 of the first exemplary embodiment.

FIG. 29 is an explanatory view of the example 3 of the first exemplary embodiment. The example 3 relates to an exemplary configuration for generation of a single data unit including HDR still image data and SDR still image data in accordance with a tagged image file format (TIFF) system.

The example 3 provides HDR imaging device 10F that can be configured to generate a single data unit including uncompressed HDR still image data according to the TIFF system and uncompressed SDR still image data according to the TIFF system. As depicted in FIG. 29, HDR imaging device 10F includes HDR imaging section 11, converter 12, JPEG compressor 13, SDR imaging section 14, HDR image corrector 15B, and TIFF output section 17A. Among the constituent elements of HDR imaging device 10F, converter 12, HDR image corrector 15B, and TIFF output section 17A correspond to generator 120 and output section 130 in image processing device 100 described with reference to FIG. 15 and FIG. 22. HDR imaging section 11, converter 12, JPEG compressor 13, and SDR imaging section 14 depicted in FIG. 29 are configured substantially identically with the constituent elements named identically and depicted in FIG. 27 and will thus not be described repeatedly.

HDR image corrector 15B is a processor corresponding to HDR image processor 121 (see FIG. 22) in generator 120 of image processing device 100. HDR image corrector 15B converts RAW data obtained from HDR imaging section 11 to a 16/12-bit image according to HDR-OETF (Hybrid Log-Gamma (HLG)) (HDR image data) displayable by an HDRTV (a display device adaptive to HLG) such as HDR display device 62. A reproduction device configured to reproduce TIFF format data (e.g. HDR display device 62) can thus simply reproduce the HDR still image data because HLG data is compatible with SDR. HDR image corrector 15B can be embodied by a processor, a memory, and the like.

TIFF output section 17A is a processor corresponding to formatting section 125 (see FIG. 22) in generator 120 and output section 130 (see FIG. 15) of image processing device 100. TIFF output section 17A generates, as single data unit D300, TIFF still image file F210 including HDR still image data and TIFF still image file F220 including SDR still image data in a TIFF file format, and outputs generated data unit D300.

Upon storage of the two types of data, namely, the HDR still image data and the SDR still image data, in the respective TIFF files, TIFF output section 17A can use a file format provided with, as TIFF tags, an HDR tag (an identifier among SDR, HDR (HLG (System Gamma 1.2)), and HDR (PQ)) and a color space tag (an identifier among sRGB, Adobe RGB, and bt.2020). TIFF output section 17A can generate data unit D300 with use of the SDR still image data output from converter 12, or the SDR still image data obtained through imaging by SDR imaging section 14.

Data unit D300 generated by TIFF output section 17A is configured correspondingly to data unit D20 depicted in FIG. 20 or the like. TIFF output section 17A can be embodied by a processor, a memory, and the like.

A conventional device (e.g. SDR display device 40, SDR printing device 50, or existing HDR display device 30) is not configured to treat data in the format according to the example 3. In HDR imaging device 10F, converter 12 SDR converts HDR still image data, and JPEG compressor 13 JPEG compresses SDR still image data obtained by the conversion, and compressed SDR still image data thus generated can be generated (recorded) simultaneously in a separate file.

The TIFF format is advantageously adopted because an HDR display device easily becomes adaptive to a TIFF file only by being equipped with a TIFF display function. An imaging device can additionally be provided simply with a function of generating data unit D300 in a TIFF file format, to relatively easily achieve the configuration according to the example 3. A device adaptive to such a new file format (e.g. HDR display device 62 or SDR printing device 63) is configured to reproduce both TIFF still image file F210 and TIFF still image file F220 in data unit D300. An HDRTV adaptive to TIFF (e.g. HDR display device 62) is configured to display both HDR still image data according to HLG and SDR still image data having a wide color gamut defined by bt.2020.

Each of the processors described above can alternatively be embodied by, in place of the processor and the memory, a dedicated circuit configured to execute corresponding one of the above various processing.

1-1-4. Example 4

Figure 30:
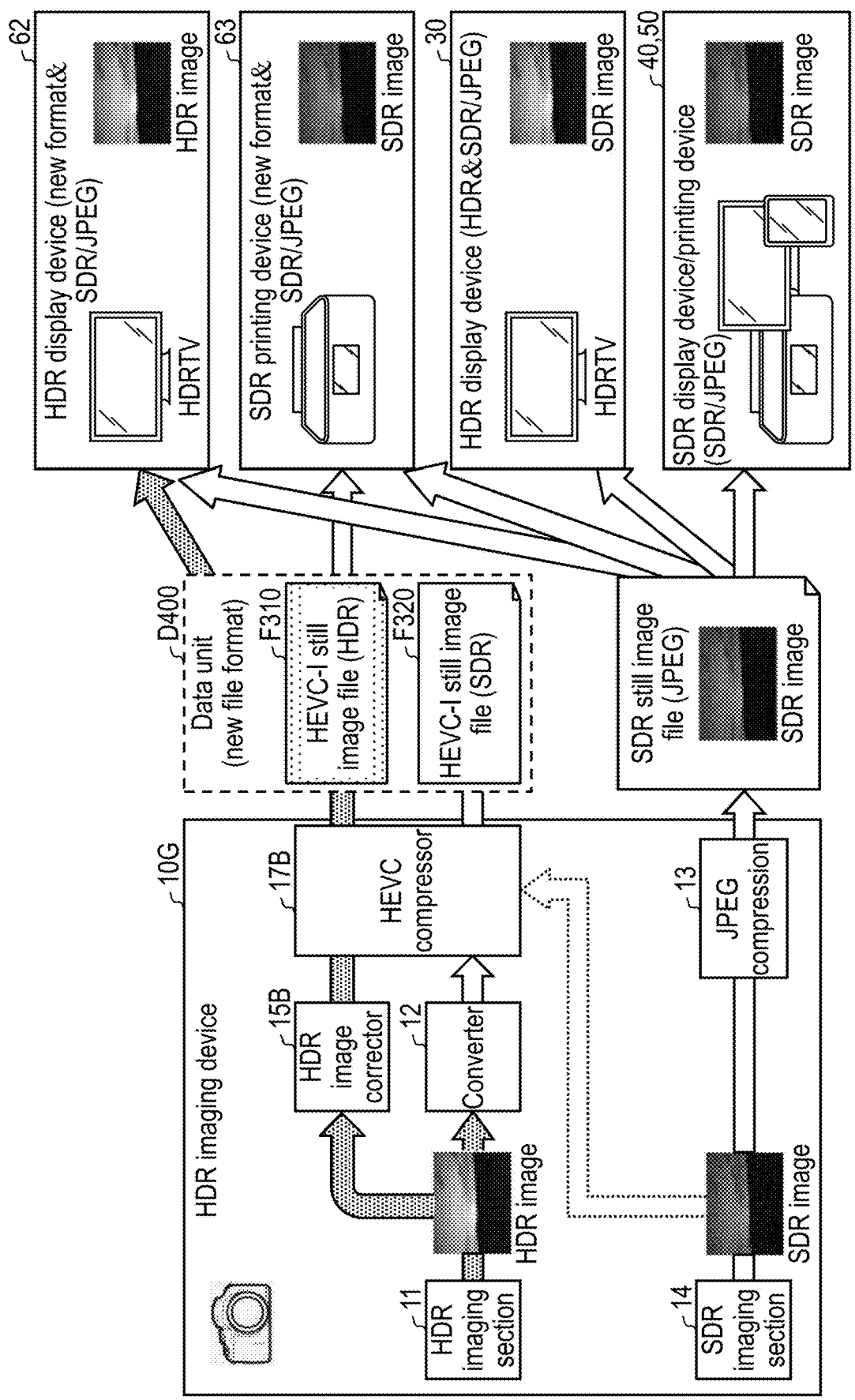
FIG. 30 is an explanatory view of an example 4 of the first exemplary embodiment.

FIG. 30 is an explanatory view of the example 4 of the first exemplary embodiment. The example 4 relates to an exemplary configuration for generation of a single data unit including HDR still image data and SDR still image data in accordance with a system for generation of an HEVC-I picture (an I picture compression system).

The example 4 provides HDR imaging device 10G that can be configured to generate a single data unit including HDR still image data and SDR still image data in accordance with the HEVC-I picture compression system. As depicted in FIG. 30, HDR imaging device 10G includes HDR imaging section 11, converter 12, JPEG compressor 13, SDR imaging section 14, HDR image corrector 15B, and HEVC compressor 17B. Among the constituent elements of HDR imaging device 10G, converter 12, HDR image corrector 15B, and HEVC compressor 17B correspond to generator 120 and output section 130 in image processing device 100 described with reference to FIG. 15 and FIG. 22. HDR imaging section 11, converter 12, JPEG compressor 13, SDR imaging section 14, and HDR image corrector 15B depicted in FIG. 30 are configured substantially identically with the constituent elements named identically and depicted in FIG. 29 and will thus not be described repeatedly.

HEVC compressor 17B is a processor corresponding to HDR image compressor 122, SDR image compressor 124, and formatting section 125 (see FIG. 22) in generator 120 and output section 130 (see FIG. 15) of image processing device 100. HEVC compressor 17B compresses, as an HEVC-I picture, HDR still image data output from HDR image corrector 15B. HEVC compressor 17B compresses, as an HEVC-I picture, SDR still image data output from converter 12. HEVC compressor 17B generates, as data unit D400, an object including HEVC-I still image file F310 having HDR still image data as an HEVC-I picture obtained by the compression and HEVC-I still image file F320 having SDR still image data as an HEVC-I picture obtained by the compression, and HEVC-I still image file F310 and HEVC-I still image file F320 have file names common in body part (a file name excluding an extension). HEVC compressor 17B then outputs generated data unit D400.

Upon storage of the two types of data, namely, the HDR still image data and the SDR still image data, in the respective HEVC-I files, HEVC compressor 17B can use a file format provided with an HDR tag (an identifier among SDR, HDR (HLG (System Gamma 1.2)), and HDR (PQ)) and a color space tag (an identifier among sRGB, Adobe RGB, and bt.2020). HEVC compressor 17B can generate data unit D400 with use of the SDR still image data output from converter 12, or the SDR still image data obtained through imaging by SDR imaging section 14.

Data unit D400 generated by HEVC compressor 17B is configured correspondingly to data unit D20 depicted in FIG. 20 or the like. HEVC compressor 17B can be embodied by a processor, a memory, and the like.

A conventional device (e.g. SDR display device 40, SDR printing device 50, or existing HDR display device 30) is not configured to treat data in the format according to the example 4. In HDR imaging device 10G, converter 12 SDR converts HDR still image data, and JPEG compressor 13 JPEG compresses SDR still image data obtained by the conversion, and compressed SDR still image data thus generated can be generated (recorded) simultaneously in a separate file.

HEVC compressor 17B can generate an HDR still image file (JPEG MPF) in the HDR still image file format, storing, in a single file, the HDR still image data and the SDR still image data in accordance with the multi picture format system. Specifically, HEVC compressor 17B can generate an HDR still image file configured similarly to data unit D10 depicted in FIG. 16.

HEVC compressor 17B can generate an HDR still image file in the HDR still image file format, storing, in a single file, the HDR still image data and the SDR still image data, not in accordance with the multi picture format system.

The HEVC-I picture compression system is advantageously adopted because an existing HDR display device is equipped with an HEVC decoding function and thus relatively easily achieves display or reproduction of an HEVC-I picture. An imaging device adaptive to imaging of a 4K moving image is often equipped with an HEVC compression function, to relatively easily achieve a function of compressing HDR still image data and SDR still image data as HEVC-I pictures. A printing device configured to reproduce an HEVC-I picture (e.g. SDR printing device 63) can print both HDR HEVC-I still image file F310 and SDR HEVC-I still image file F320. An HDRTV configured to display an HEVC-I picture (e.g. HDR display device 62) can display both an HDR still image according to HLG and an SDR still image having a wide color gamut defined by bt.2020.

Each of the processors described above can alternatively be embodied by, in place of the processor and the memory, a dedicated circuit configured to execute corresponding one of the above various processing.

1-1-5. Example 5

Figure 31:
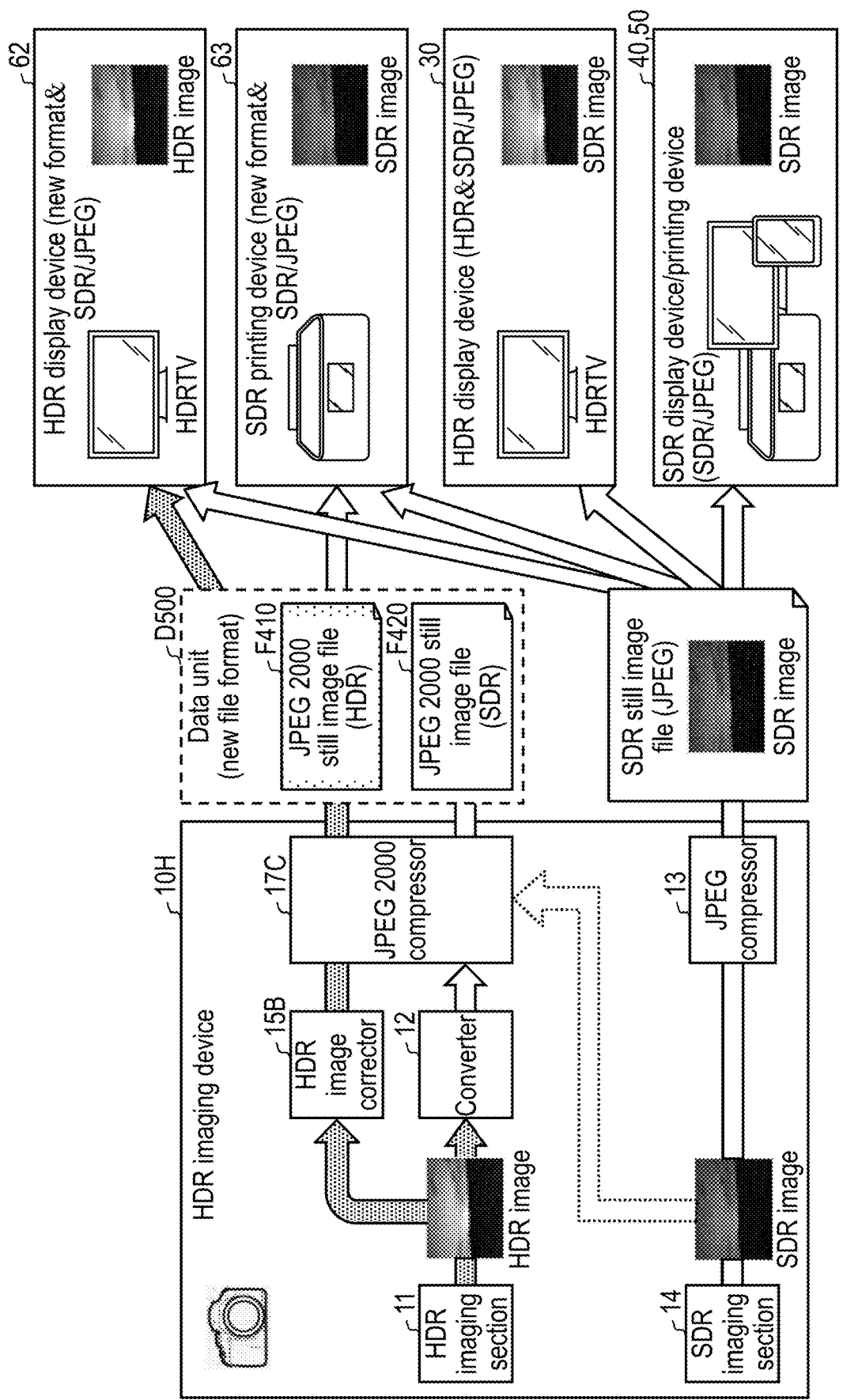
FIG. 31 is an explanatory view of an example 5 of the first exemplary embodiment.

FIG. 31 is an explanatory view of the example 5 of the first exemplary embodiment. The example 5 relates to an exemplary configuration for generation of a single data unit including HDR still image data and SDR still image data in accordance with a JPEG 2000 compression system.

The example 5 provides HDR imaging device 10H that can be configured to generate a single data unit including HDR still image data and SDR still image data in accordance with the JPEG 2000 compression system. As depicted in FIG. 31, HDR imaging device 10H includes HDR imaging section 11, converter 12, JPEG compressor 13, SDR imaging section 14, HDR image corrector 15B, and JPEG 2000 compressor 17C. Among the constituent elements of HDR imaging device 10H, converter 12, HDR image corrector 15B, and JPEG 2000 compressor 17C correspond to generator 120 and output section 130 in image processing device 100 described with reference to FIG. 15 and FIG. 22. HDR imaging section 11, converter 12, JPEG compressor 13, SDR imaging section 14, and HDR image corrector 15B depicted in FIG. 31 are configured substantially identically with the constituent elements named identically and depicted in FIG. 29 and will thus not be described repeatedly.

JPEG 2000 compressor 17C is a processor corresponding to HDR image compressor 122, SDR image compressor 124, and formatting section 125 (see FIG. 22) in generator 120 and output section 130 (see FIG. 15) of image processing device 100. JPEG 2000 compressor 17C compresses, in the JPEG 2000 system, HDR still image data output from HDR image corrector 15B. JPEG 2000 compressor 17C compresses, in the JPEG 2000 system, SDR still image data output from converter 12. JPEG 2000 compressor 17C generates, as data unit D500, an object including JPEG 2000 still image file F410 having HDR still image data in a JPEG 2000 format obtained by the compression and JPEG 2000 still image file F420 having SDR still image data in the JPEG 2000 format obtained by the compression, and JPEG 2000 still image file F410 and JPEG 2000 still image file F420 have file names common in body part (a file name excluding an extension). JPEG 2000 compressor 17C then outputs generated data unit D500.

Upon storage of the two types of data, namely, the HDR still image data and the SDR still image data, in the respective JPEG 2000 files, JPEG 2000 compressor 17C can use a file format provided with an HDR tag (an identifier among SDR, HDR (HLG (System Gamma 1.2)), and HDR (PQ)) and a color space tag (an identifier among sRGB, Adobe RGB, and bt.2020). JPEG 2000 compressor 17C can generate data unit D500 with use of the SDR still image data output from converter 12, or the SDR still image data obtained through imaging by SDR imaging section 14.

Data unit D500 generated by JPEG 2000 compressor 17C is configured correspondingly to data unit D20 depicted in FIG. 20 or the like. JPEG 2000 compressor 17C can be embodied by a processor, a memory, and the like.

A conventional device (e.g. SDR display device 40, SDR printing device 50, or existing HDR display device 30) is not configured to treat data in the format according to the example 5. In HDR imaging device 10H, converter 12 SDR converts HDR still image data, and JPEG compressor 13 JPEG compresses SDR still image data obtained by the conversion, and compressed SDR still image data thus generated can be generated (recorded) simultaneously in a separate file.

JPEG 2000 compressor 17C can generate an HDR still image file (JPEG MPF) in the HDR still image file format, storing, in a single file, the HDR still image data and the SDR still image data in accordance with the multi picture format system. Specifically, JPEG 2000 compressor 17C can generate an HDR still image file configured similarly to data unit D10 depicted in FIG. 16.

JPEG 2000 compressor 17C can generate an HDR still image file in the HDR still image file format, storing, in a single file, the HDR still image data and the SDR still image data, not in accordance with the multi picture format system.

The JPEG 2000 compression system is advantageously adopted because an existing HDR display device is relatively easily equipped with a function adaptive to JPEG 2000. An HDRTV adaptive to JPEG 2000 (e.g. HDR display device 62) is configured to reproduce both HDR JPEG 2000 still image file F410 and SDR JPEG 2000 still image file F420. An HDRTV adaptive to JPEG 2000 (e.g. HDR display device 62) is configured to display both an HDR still image according to HLG and an SDR still image having a wide color gamut defined by bt.2020.

Each of the processors described above can alternatively be embodied by, in place of the processor and the memory, a dedicated circuit configured to execute corresponding one of the above various processing.

1-1-6. Example 6

Figure 32:
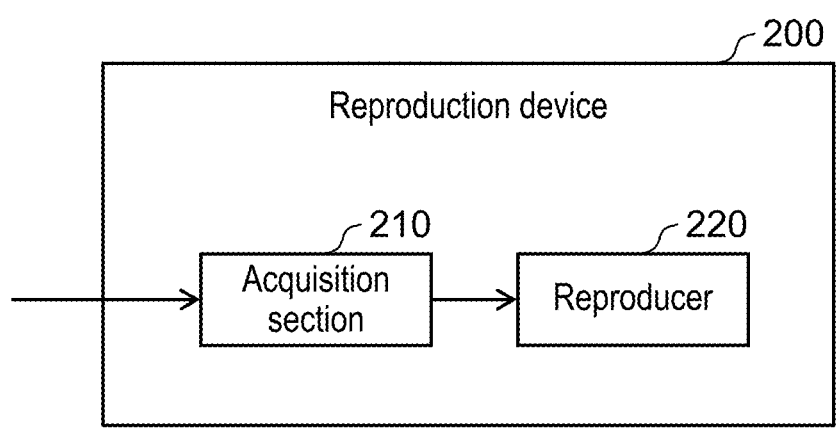
FIG. 32 is a block diagram schematically depicting an exemplary configuration of a reproduction device according to the first exemplary embodiment.

FIG. 32 is a block diagram schematically depicting an exemplary configuration of a reproduction device according to the first exemplary embodiment.

As depicted in FIG. 32, reproduction device 200 includes acquisition section 210 and reproducer 220. Reproduction device 200 can further include a display (not depicted) to function as a display device configured to display a reproduction result on the display. Reproduction device 200 can further include a printer to function as a printing device configured to print a reproduction result on a printing medium like paper.

Acquisition section 210 acquires a logically single data unit. The logically single data unit includes HDR still image data and SDR still image data different from each other in luminance dynamic range and reproducible independently from each other.

Reproducer 220 is configured to reproduce either one of the HDR still image data or the SDR still image data included in the data unit acquired by acquisition section 210. Reproducer 220 can be configured to reproduce the HDR still image data selected in accordance with auxiliary information supplementing the data unit. In a case where the auxiliary information includes luminance region information, reproducer 220 can be configured to adjust luminance of HDR still image data so as to include an entire prioritized luminance region as indicated by the luminance region information in the luminance region of the HDR still image data, and reproduce image data having adjusted luminance.

In a case where reproducer 220 reproduces HDR still image data (e.g. HDR still image data indicated in FIG. 18) having a prioritized high luminance region as indicated by the luminance region information, reproducer 220 can convert the HDR still image data to image data having luminance adjusted to include all of the prioritized high luminance region as indicated, and reproduce the converted image data. In another case where reproducer 220 reproduces HDR still image data (e.g. HDR still image data indicated in FIG. 19) having a prioritized low luminance region as indicated by the luminance region information, reproducer 220 can convert the HDR still image data to image data having luminance adjusted to include all of the prioritized low luminance region as indicated, and reproduce the converted image data.

Operation relevant to reproduction processing by reproduction device 200 will be described next with reference to a flowchart.

Figure 33:
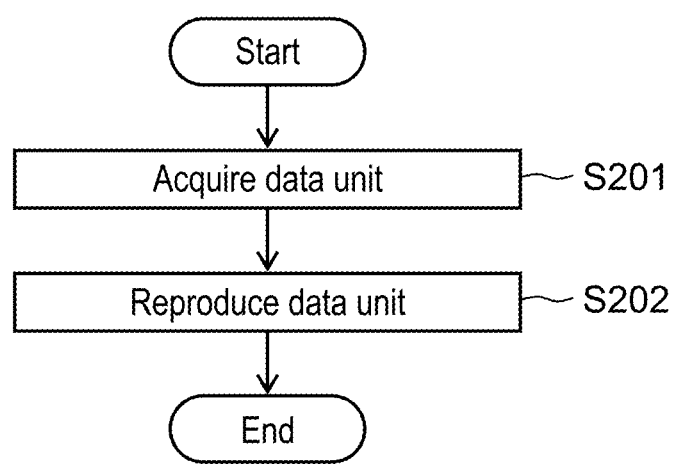
FIG. 33 is a flowchart depicting exemplary operation relevant to reproduction processing executed by the reproduction device according to the first exemplary embodiment.

FIG. 33 is a flowchart depicting exemplary operation relevant to reproduction processing executed by reproduction device 200 according to the first exemplary embodiment.

Acquisition section 210 in reproduction device 200 acquires a data unit (step S201).

Reproducer 220 reproduces either one of the HDR still image data or the SDR still image data included in the data unit acquired by acquisition section 210 in step S201 (step S202).

Each of acquisition section 210 and reproducer 220 can be embodied by a processor configured to execute a predetermined program (a program prepared for execution of the above various processing) and a memory storing the predetermined program, or can be embodied by, in place of the processor and the memory, a dedicated circuit configured to execute the above various processing.

1-1-7. Example 7

Operation of reproduction device 200 will be specifically exemplified next.

Figure 34:
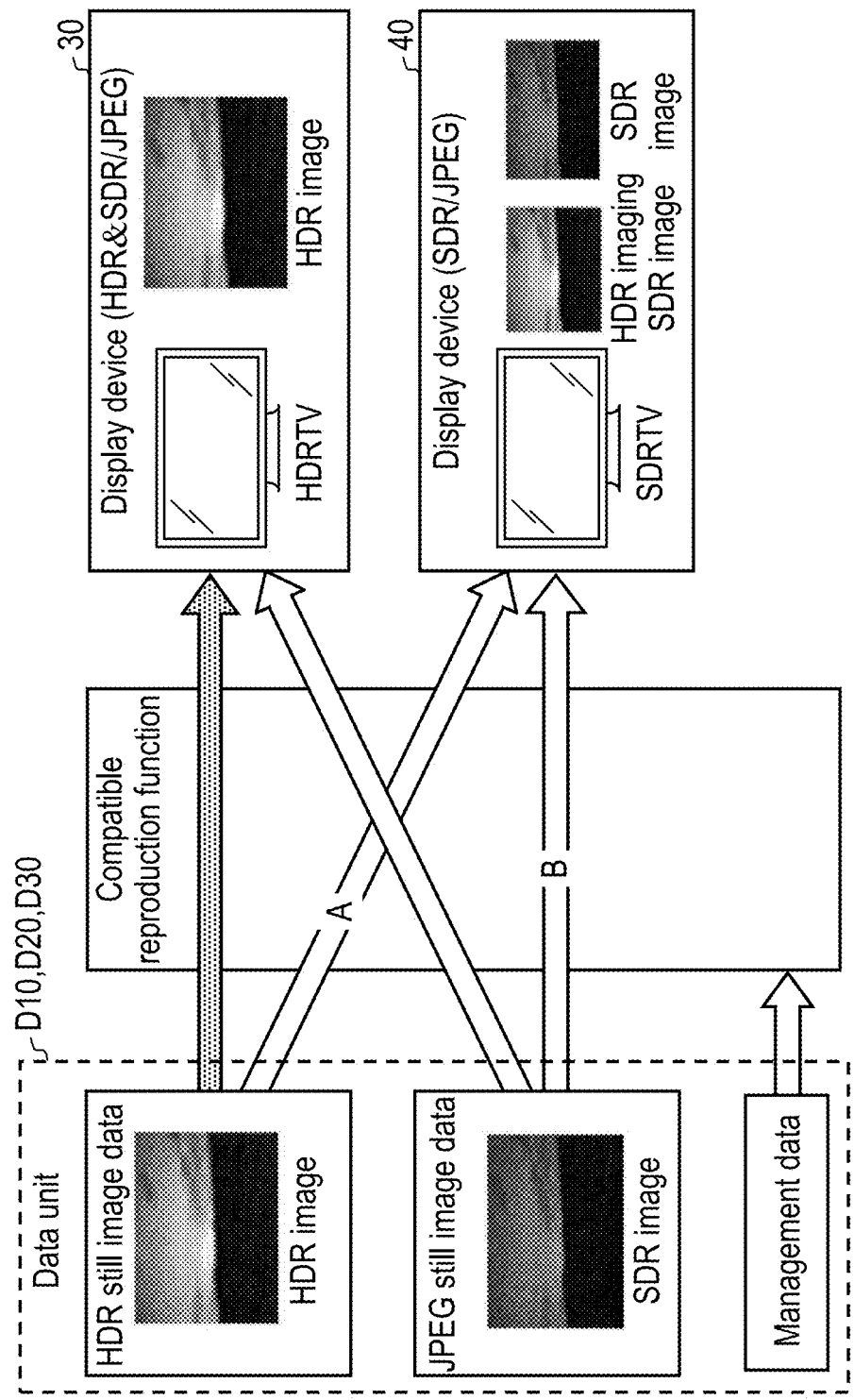
FIG. 34 is an explanatory view of specifically exemplary auxiliary information according to the first exemplary embodiment.

FIG. 34 is an explanatory view of specifically exemplary auxiliary information according to the first exemplary embodiment.

As described earlier, image processing device 100 (see FIG. 15) can supplement with auxiliary information upon generation of a data unit. Specifically, image processing device 100 can generate and output a data unit supplemented with the auxiliary information.

In this configuration, the auxiliary information can include information indicating reproducibility of a high quality image. In a case where reproduction device 200 is an SDR reproduction device adaptive to a new still image format, the auxiliary information can include information referred to for determination of whether an SDR image in the JPEG format is displayed (route B indicated in FIG. 34) or an SDR image obtained by SDR conversion of an HDR image (HLG) is displayed (route A indicated in FIG. 34) when the SDR reproduction device reproduces SDR still image data. The auxiliary information can include information indicating reproducibility of a high quality image when the SDR reproduction device displays an image obtained by SDR conversion of an HDR image (HLG).

The auxiliary information can also include luminance region information indicating whether or not a still image according to HDR still image data has luminance prioritized in a high luminance region, or luminance region information indicating whether or not the still image according to the HDR still image data has luminance prioritized in a low luminance region. Specifically, the auxiliary information can include a flag indicating whether or not an HDR still image is generated to have a prioritized high luminance region, or a flag indicating whether or not the HDR still image is generated to have a prioritized low luminance region. In this case, the auxiliary information can include a threshold defining the high luminance region or the low luminance region prioritized upon generation of the still image.

The auxiliary information can include an instruction flag (conversion inhibiting flag) indicating a photographer's instruction for simple display of an SDR image in the JPEG format without conversion of an HDR image to an SDR image when an SDR display device displays an SDR image.

The HDR still image data, the SDR still image data, and management information can be stored in a single file. The HDR still image data, the SDR still image data, and the management information can be generated as a logically single data unit including a plurality of files that are associated with each other, of design rule for camera file system (DCF) objects and have file names common in body part (a file name excluding an extension).

1-2. Effects, Etc.

As described above, the present exemplary embodiment provides an image processing device including: an acquisition section configured to acquire still image data obtained by imaging; a generator configured to generate, from the still image data acquired by the acquisition section, a logically single data unit including first still image data and second still image data different from each other in luminance dynamic range and reproducible independently from each other; and an output section configured to output the data unit generated by the generator.

The present exemplary embodiment provides a reproduction device including: an acquisition section configured to acquire a logically single data unit including first still image data and second still image data different from each other in luminance dynamic range and reproducible independently from each other; and a reproducer configured to reproduce either one of the first still image data or the second still image data included in the data unit acquired by the acquisition section.

The present exemplary embodiment provides an image processing method including: acquiring still image data obtained by imaging; generating, from the acquired still image data, a logically single data unit including first still image data and second still image data different from each other in luminance dynamic range and reproducible independently from each other; and outputting the generated data unit.

The present exemplary embodiment provides a reproduction method including: acquiring a logically single data unit including first still image data and second still image data different from each other in luminance dynamic range and reproducible independently from each other; and reproducing either one of the first still image data or the second still image data included in the acquired data unit.

Image processing device 100 exemplifies the image processing device. Acquisition section 110 exemplifies the acquisition section included in the image processing device. Generator 120 and generator 120A each exemplify the generator. Output section 130 exemplifies the output section. Multi picture format generator 13C, data unit generator 17, TIFF output section 17A, HEVC compressor 17B, and JPEG 2000 compressor 17C each correspond to output section 130. HDR still image data exemplifies the first still image data. SDR still image data exemplifies the second still image data. Reproduction device 200 exemplifies the reproduction device. Acquisition section 210 exemplifies the acquisition section included in the reproduction device. Data unit D10, data unit D20, data unit D30, data unit D200, data unit D300, data unit D400, and data unit D500 each exemplify the data unit generated by the generator in the image processing device and each exemplify the data unit acquired by the acquisition section in the reproduction device. Reproducer 220 exemplifies the reproducer.

Image processing device 100 according to the first exemplary embodiment includes acquisition section 110, generator 120, and output section 130. Acquisition section 110 acquires still image data. Generator 120 generates, from the still image data acquired by acquisition section 110, a logically single data unit including first still image data (HDR still image data) and second still image data (SDR still image data) different from each other in luminance dynamic range and reproducible independently from each other. Output section 130 outputs a data unit (e.g. data unit D10) generated by generator 120.

Reproduction device 200 according to the first exemplary embodiment includes: acquisition section 210 configured to acquire a logically single data unit (e.g. data unit D10) including first still image data (HDR still image data) and second still image data (SDR still image data) different from each other in luminance dynamic range and reproducible independently from each other; and reproducer 220 configured to reproduce either one of the first still image data (HDR still image data) or the second still image data (SDR still image data) included in the data unit (e.g. data unit D10) acquired by acquisition section 210.

Image processing device 100 thus configured can output the logically single data unit including HDR still image data and SDR still image data different from each other in luminance dynamic range and reproducible independently from each other. Reproduction device 200 can acquire and reproduce the data unit. Image processing device 100 can thus output the data unit, and a reproduction device (e.g. reproduction device 200) can reproduce either the HDR still image data or the SDR still image data included in the data unit. Image processing device 100 can thus provide still image data highly convenient for a user.

The generator in the image processing device can be configured to generate, as the data unit, a single file including the first still image data and the second still image data.

First still image data D12 exemplifies the first still image data. Second still image data D13 exemplifies the second still image data. File F10 exemplifies the single file including the first still image data and the second still image data. Data unit D10 exemplifies the data unit generated by the generator. HDR still image file F100 corresponds to file F10.

In image processing device 100 according to the first exemplary embodiment, generator 120 generates, as data unit D10, single file F10 including first still image data D12 (HDR still image data) and second still image data D13 (SDR still image data).

Image processing device 100 thus configured prevents the HDR still image data and the SDR still image data from being managed separately.

The generator in the image processing device can be configured to generate, as the data unit, an object including a single first still image file having the first still image data, and a second still image file having the second still image data and a file name identical in body part with a file name of the first still image file.

First still image data D22 and first still image data D32 each exemplify the first still image data. Second still image data D24 and second still image data D33 each exemplify the second still image data. First still image file F21 and first still image file F32 each exemplify the first still image file. Second still image file F22 and second still image file F33 each exemplify the second still image file. DSC0002 and DSC0003 each exemplify a body part of a file name (a file name excluding an extension). Data unit D20 and data unit D30 each exemplify the data unit generated by the generator. HDR still image file F110, TIFF still image file F210, HEVC-I still image file F310, and JPEG 2000 still image file F410 each correspond to first still image file F21 (or first still image file F32). SDR still image file F120, TIFF still image file F220, HEVC-I still image file F320, and JPEG 2000 still image file F420 each correspond to second still image file F22 (or second still image file F33). Data unit D200, data unit D300, data unit D400, and data unit D500 each correspond to data unit D20 (or data unit D30).

In image processing device 100 according to the first exemplary embodiment, generator 120 can be configured to generate, as a data unit (e.g. data unit D20), an object including a single HDR still image file (e.g. first still image file F21) having HDR still image data (e.g. first still image data D22), and an SDR still image file (e.g. second still image file F22) having SDR still image data (e.g. second still image data D24) and a file name having a body part (e.g. DSC0002) identical with a body part (e.g. DSC0002) in a file name of the HDR still image file (e.g. first still image file F21).

Image processing device 100 thus configured allows a reproduction device (e.g. reproduction device 200) to reproduce an image with use of an adaptive file if the reproduction device is adaptive to reproduction of an HDR still image file or an SDR still image file.

The generator in the image processing device can be configured to further supplement the data unit with auxiliary information indicating that an image obtained by reproduction of the first still image data is higher in quality than an image obtained by reproduction of the second still image data.

The auxiliary information included in management data D11 exemplifies the auxiliary information.

In image processing device 100 according to the first exemplary embodiment, generator 120 supplements the data unit (e.g. data unit D10) with auxiliary information indicating that an image obtained by reproduction of HDR still image data (e.g. first still image data D12) is higher in quality than an image obtained by reproduction of SDR still image data (e.g. second still image data D13).

Image processing device 100 thus configured allows a reproduction device (e.g. reproduction device 200) having received the data unit (e.g. data unit D10) to reproduce, in accordance with the auxiliary information, a still image having quality achieved by maximally utilizing reproduction capability of the reproduction device.

The generator in the image processing device can be configured to supplement the data unit with auxiliary information including luminance region information indicating whether or not a still image according to the first still image data has luminance prioritized in a high luminance region, or luminance region information indicating whether or not the still image according to the first still image data has luminance prioritized in a low luminance region.

Generator 120 in image processing device 100 according to the first exemplary embodiment can be configured to supplement the data unit with auxiliary information including luminance region information indicating whether or not a still image according to HDR still image data (the first still image data) has luminance prioritized in a high luminance region, or luminance region information indicating whether or not the still image according to the HDR still image data has luminance prioritized in a low luminance region.

Image processing device 100 thus configured allows a reproduction device (e.g. reproduction device 200) having received the data unit to reproduce, in accordance with the auxiliary information, a still image having quality achieved by effectively utilizing reproduction capability of the reproduction device.

In the image processing device, the first still image data can be HDR image data whereas the second still image data can be SDR image data.

In image processing device 100 according to the first exemplary embodiment, the first still image data is HDR image data whereas the second still image data is SDR image data.

Other Exemplary Embodiments

The first exemplary embodiment has been described above to exemplify the technique disclosed in the present application. However, the technique according to the present disclosure is not limited thereto, and is also applicable to exemplary embodiments achieved by modification, replacement, addition, removal, and the like. A new exemplary embodiment can also be achieved by combination of the constituent elements described in the examples 1 to 7 of the first exemplary embodiment.

Each of the constituent elements in the above exemplary embodiment described above can be configured by dedicated hardware or can be embodied through execution, by a processor, of a software program suitable for the corresponding constituent element. Each of the constituent elements can be embodied by causing a program execution section such as a central processing unit (CPU) or a processor to read out and execute a software program recorded on a recording medium such as a hard disk or a semiconductor memory. Software for implementation of the image processing method, the reproduction method, or the like according to the above exemplary embodiment is the following program.

Specifically, the program causes a computer to execute an image processing method including: acquiring still image data obtained by imaging; generating, from the acquired still image data, a logically single data unit including first still image data and second still image data different from each other in luminance dynamic range and reproducible independently from each other; and outputting the generated data unit.

The program alternatively causes the computer to execute a reproduction method including: acquiring a logically single data unit including first still image data and second still image data different from each other in luminance dynamic range and reproducible independently from each other; and reproducing either one of the first still image data or the second still image data included in the acquired data unit.

The constituent elements appearing in the accompanying drawings and the detailed description can include constituent elements essential for achievement of the object as well as constituent elements unessential for achievement of the object, in order for exemplification of the above technique. Appearance of such unessential constituent elements in the accompanying drawings and the detailed description should not simply lead to recognition of these unessential constituent elements as being essential.

The above exemplary embodiments are provided for exemplification of the technique according to the present disclosure, and can thus be modified, replaced, added, removed, and the like in various manners within the scope of the claims or an equivalent scope.

INDUSTRIAL APPLICABILITY

The present disclosure is applicable to an image processing device configured to obtain highly convenient still image data, a reproduction device configured to reproduce the still image data, an image processing method, and a reproduction method. Specifically, the present disclosure is applicable to an imaging device like a camera, a display device like a television, a printing device, or the like.

REFERENCE MARKS IN THE DRAWINGS 10, 10A, 10B, 10C, 10D, 10E, 10F, 10G, 10H: HDR imaging device
11: HDR imaging section
12: converter
13, 13A: JPEG compressor
13B: JPEG XT compressor
13C: multi picture format generator
13D: HEVC compressor
14: SDR imaging section
15, 15A, 15B: HDR image corrector
16: HDMI output section
17: data unit generator
17A: TIFF output section
17B: HEVC compressor
17C: JPEG 2000 compressor
20: SDR imaging device
21: SDR imaging section
22: JPEG compressor
30, 60, 61, 62: HDR display device
40: SDR display device
50, 63: SDR printing device
100: image processing device
110: acquisition section
120, 120A: generator
121: HDR image processor
122: HDR image compressor
123: converter
123A: SDR image processor
124: SDR image compressor
125: formatting section
130: output section
200: reproduction device
210: acquisition section
220: reproducer
D10, D20, D30: data unit
D11, D31: management data
D12, D22, D32: first still image data
D13, D24, D33: second still image data
D21: first management data
D23: second management data
D200, D300, D400, D500: data unit
F10: file
F21, F32: first still image file
F22, F33: second still image file
F31: management file
F100, F110: HDR still image file
F120: SDR still image file
F210, F220: TIFF still image file
F310, F320: HEVC-I still image file
F410, F420: JPEG 2000 still image file

The invention claimed is:

1. An image processing device comprising:
an acquisition section configured to acquire still image data obtained by imaging;
a generator comprising:
a first image processor configured to convert the acquired still image data into first still image data having a first luminance dynamic range;
a second image processor configured to convert the first still image data into second still image data having a second luminance dynamic range different from the first luminance dynamic range, the first still image data and the second still image data being reproducible as images independently from each other; and
a file generator configured to generate a logically single data unit including the first still image data and the second still image data; and
an output section configured to output the logically single data unit generated by the generator,
wherein the generator generates, as the logically single data unit, an object including a single first still image file having the first still image data, a second still image file having the second still image data, and a management file having management data for management of the first still image data and the second still image data, and
each of the second still image file and the management file has a file name identical in an entirety of body part other than an extension with a file name of the single first still image file.

2. The image processing device according to claim 1, wherein the management data includes auxiliary information indicating that an image obtained by reproduction of the first still image data is higher in quality than an image obtained by reproduction of the second still image data.

3. The image processing device according to claim 2, wherein the auxiliary information includes luminance region information indicating whether or not a still image according to the first still image data has luminance prioritized in a high luminance region, or luminance region information indicating whether or not the still image according to the first still image data has luminance prioritized in a low luminance region.

4. The image processing device according to claim 1, wherein:
the first still image data is high dynamic range (HDR) image data, and
the second still image data is standard dynamic range (SDR) image data.

5. A reproduction device comprising:
an acquisition section configured to acquire a logically single data unit including first still image data and second still image data different from each other in luminance dynamic range and reproducible independently as still images from each other; and
a reproducer configured to reproduce either one of the first still image data or the second still image data included in the logically single data unit acquired by the acquisition section,
wherein the reproduction device supports a still image data format corresponding to only one of the first still image data or the second still image data, and
the logically single data unit includes a single first still image file having the first still image data, a second still image file having the second still image data, and a management file having a management data for management of the first still image data and the second still image data, and each of the second still image file and the management file has a file name identical in an entirety of body part other than an extension with a file name of the single first still image file.

6. An image processing method comprising:

acquiring still image data obtained by imaging;

converting the acquired still image data into first still image data having a first luminance dynamic range;

converting the first still image data into second still image data having a second luminance dynamic range different from the first luminance dynamic range, the first still image data and the second still image data being reproducible as images independently from each other;

generating a logically single data unit including the first still image data and the second still image data; and outputting the generated logically single data unit, wherein the logically single data unit includes a single first still image file having the first still image data, a second still image file having the second still image data, and a management file having a management data for management of the first still image data and the second still image data, and each of the second still image file and the management file has a file name identical in an entirety of body part other than an extension with a file name of the single first still image file.

7. A reproduction method comprising:

acquiring a logically single data unit including first still image data and second still image data different from each other in luminance dynamic range and reproducible independently from each other; and reproducing only either one of the first still image data or the second still image data included in the acquired logically single data unit, wherein the logically single data unit includes a single first still image file having the first still image data, a second still image file having the second still image data, and a management file having a management data for management of the first still image data and the second still image data, and each of the second still image file and the management file has a file name identical in an entirety of body part other than an extension with a file name of the single first still image file.

\* \* \* \* \*